(12) United States Patent
Oishi et al.

(10) Patent No.: US 11,611,845 B2
(45) Date of Patent: Mar. 21, 2023

(54) COMMUNICATION DEVICE AND STORAGE MEDIUM

(71) Applicant: KABUSHIKI KAISHA TOKAI RIKA DENKI SEISAKUSHO, Aichi (JP)

(72) Inventors: Yoshiki Oishi, Aichi (JP); Satoshi Mori, Aichi (JP); Kenichi Koga, Aichi (JP); Tatsuya Koike, Aichi (JP); Kazuki Naiki, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 28 days.

(21) Appl. No.: 17/162,252

(22) Filed: Jan. 29, 2021

(65) Prior Publication Data

US 2021/0258716 A1 Aug. 19, 2021

(30) Foreign Application Priority Data

Feb. 14, 2020 (JP) .............................. JP2020-023212

(51) Int. Cl.
*H04W 4/02* (2018.01)

(52) U.S. Cl.
CPC ..................................... *H04W 4/02* (2013.01)

(58) Field of Classification Search
None
See application file for complete search history.

(56) References Cited

U.S. PATENT DOCUMENTS

| | | | |
|---|---|---|---|
| 2003/0087604 A1* | 5/2003 | Stein | H04W 64/00 455/65 |
| 2011/0076975 A1* | 3/2011 | Kim | G01S 5/14 455/226.1 |
| 2015/0050944 A1* | 2/2015 | Ekbatani | H04W 4/35 455/456.1 |
| 2016/0373162 A1* | 12/2016 | Dan | H04B 1/7183 |
| 2017/0288897 A1* | 10/2017 | You | H04W 64/003 |
| 2018/0084105 A1* | 3/2018 | Hiscock | H04B 7/0617 |
| 2019/0053013 A1* | 2/2019 | Markhovsky | G01S 5/10 |
| 2020/0116817 A1* | 4/2020 | Chuo | H04L 27/2627 |
| 2021/0003660 A1* | 1/2021 | Brede | H04B 17/27 |

FOREIGN PATENT DOCUMENTS

WO 2015/176776 11/2015

* cited by examiner

*Primary Examiner* — Ernest G Tacsik
(74) *Attorney, Agent, or Firm* — Greenblum & Bernstein, P.L.C.

(57) ABSTRACT

A communication device controls a process for determining a position of another device in accordance with a radio propagation environment. The communication device includes a wireless communication section configured to receive wireless signals from another communication device and a control section configured to calculate a reliability parameter. The reliability parameter serves as an indicator that indicates whether a first incoming wave serving as a signal detected as a signal that meets a predetermined detection standard is an appropriate process target, among the wireless signals received by the wireless communication section. The reliability parameter also controls a positional parameter determination process of determining a positional parameter indicating a position of the other communication device on a basis of the first incoming wave, and on a basis of the reliability parameter.

13 Claims, 17 Drawing Sheets

FIG.10
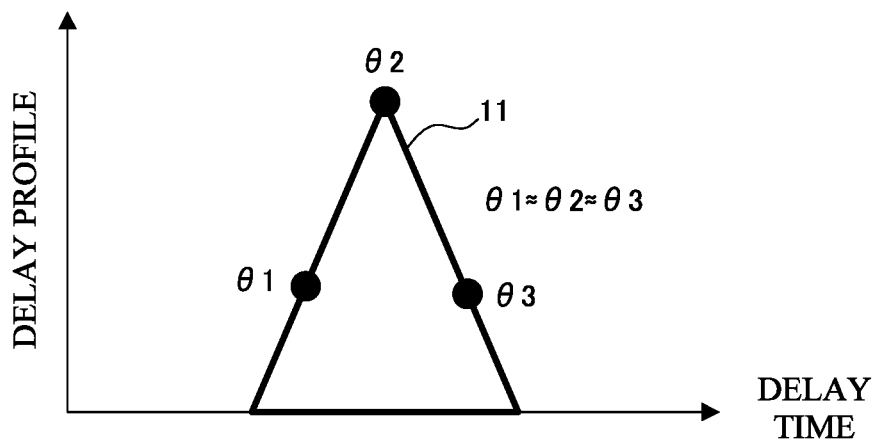
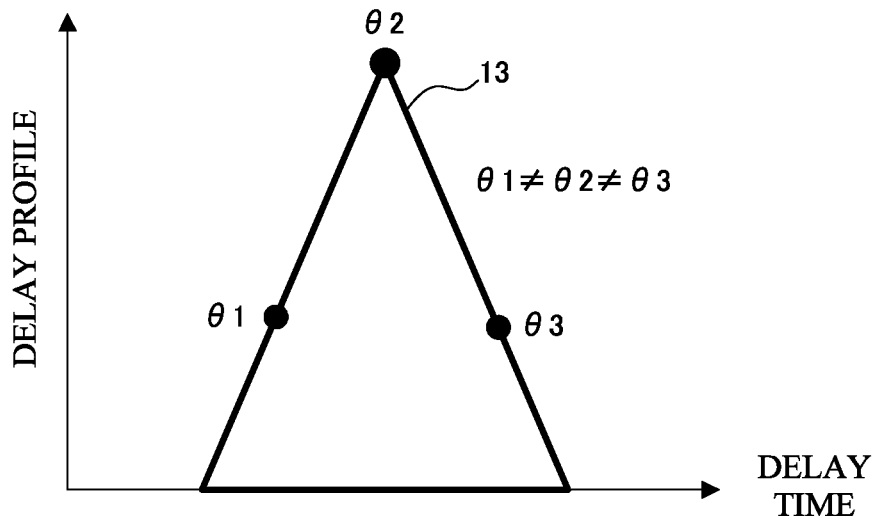

FIG.13
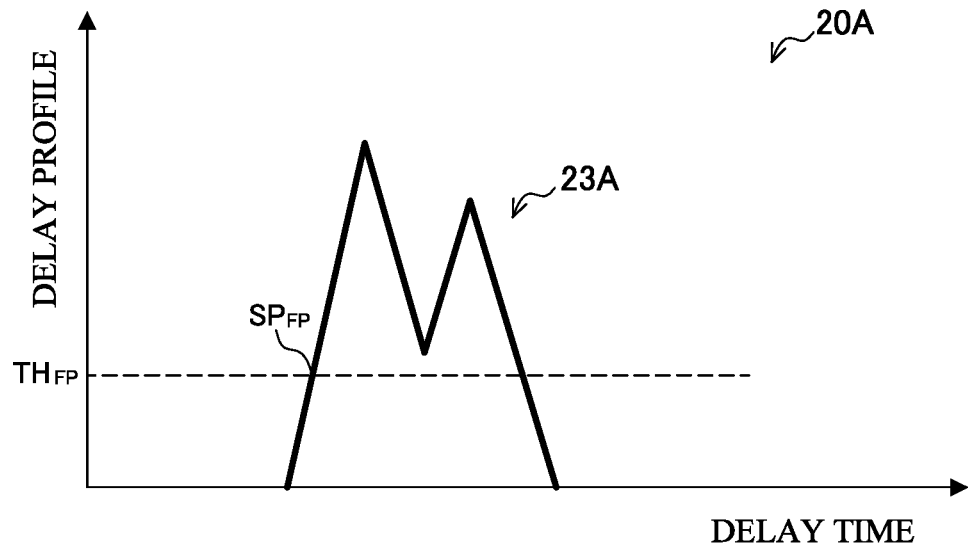
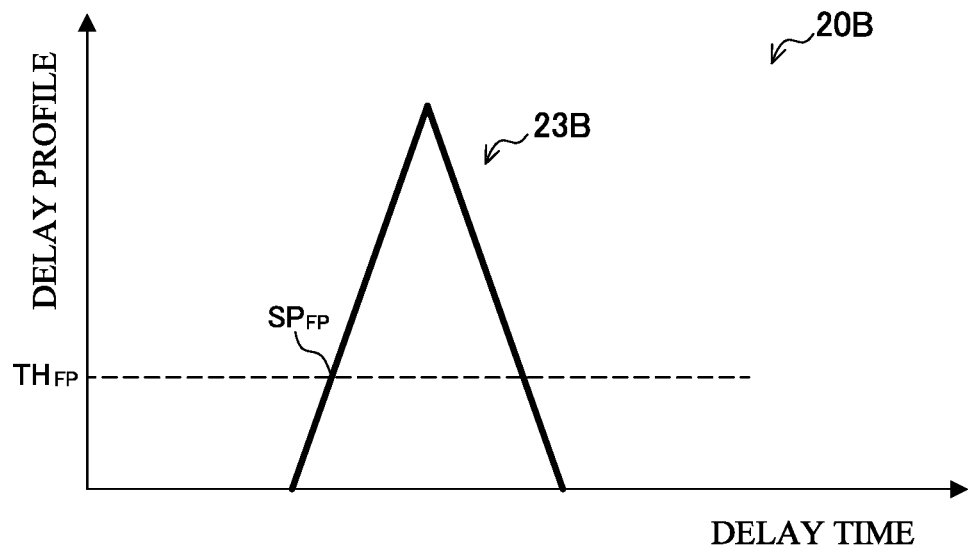

COMMUNICATION DEVICE AND STORAGE MEDIUM

CROSS REFERENCE TO RELATED APPLICATION(S)

This application is based upon and claims benefit of priority from Japanese Patent Application No. JP2020-023212, filed on Feb. 14, 2020, the entire contents of which are incorporated herein by reference.

BACKGROUND

The present invention relates to a communication device and a storage medium.

In recent years, technologies that allow one device to determine a position of another device in accordance with a result of transmitting/receiving a signal between the devices have been developed. As an example of the technologies of determining a position, WO 2015/176776 A1 discloses a technology that allows an UWB (ultra-wideband) receiver to determine an angle of incidence of a wireless signal from an UWB transmitter by performing wireless communication using UWB.

However, the technology disclosed by WO 2015/176776 A1 does not deal with reduction in accuracy of determining the angle of incidence of the wireless signal in an environment where an obstacle is interposed between the transmitter and the receiver, or other environments.

Accordingly, the present invention is made in view of the aforementioned issues, and an object of the present invention is to provide a mechanism that makes it possible to control a process of determining a position in accordance with a radio propagation environment.

SUMMARY

To solve the above described problem, according to an aspect of the present invention, there is provided a communication device comprising: a wireless communication section configured to receive wireless signals from another communication device; and a control section configured to calculate a reliability parameter serving as an indicator that indicates whether a first incoming wave serving as a signal detected as a signal that meets a predetermined detection standard is an appropriate process target, among the wireless signals received by the wireless communication section, and control a positional parameter determination process of determining a positional parameter indicating a position of the other communication device on a basis of the first incoming wave, on a basis of the reliability parameter.

To solve the above described problem, according to another aspect of the present invention, there is provided a storage medium having a program stored therein, the program causing a computer for controlling a communication device that receives wireless signals from another communication device, to function as a control section configured to calculate a reliability parameter serving as an indicator that indicates whether a first incoming wave serving as a signal detected as a signal that meets a predetermined detection standard is an appropriate process target, among the wireless signals received by the communication device, and control a positional parameter determination process of determining a positional parameter indicating a position of the other communication device on a basis of the first incoming wave, on a basis of the reliability parameter.

As described above, according to the present invention, it is possible to provide the mechanism that makes it possible to control a process of determining a position in accordance with a radio propagation environment.

BRIEF DESCRIPTION OF THE DRAWINGS

FIG. 10 is diagrams for describing examples of the reliability parameter according to the embodiment.

FIG. 13 is graphs illustrating examples of CIRs with regard to a plurality of the antennas.

DETAILED DESCRIPTION OF THE EMBODIMENT(S)

Figure 1:
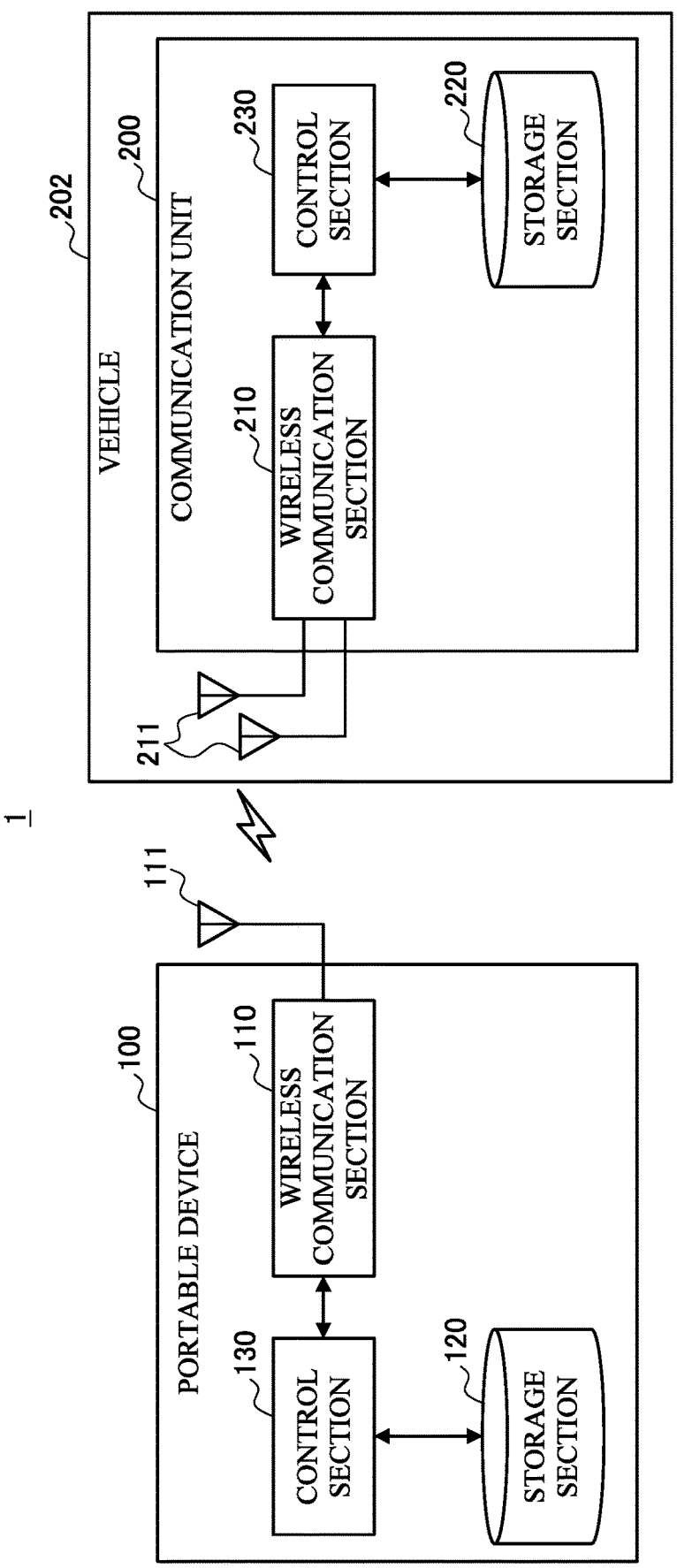
FIG. 1 is a diagram illustrating an example of a configuration of a system according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. Configuration Example

FIG. 1 is a diagram illustrating an example of a configuration of a system 1 according to an embodiment of the present invention. As illustrated in FIG. 1, the system 1 according to the present embodiment includes a portable device 100 and a communication unit 200. The communication unit 200 according to the present embodiment is installed in a vehicle 202. The vehicle 202 is an example of a usage target of the user.

A communication device of an authenticatee (also referred to as a first communication device) and a communication device of an authenticator (also referred to as a second communication device) are involved in the present embodiment. In the example illustrated in FIG. 1, the portable device 100 is an example of the first communication device, and the communication unit 200 is an example of the second communication device.

When a user (for example, a driver of the vehicle 202) carrying the portable device 100 approaches the vehicle 202, the system 1 performs wireless communication for authentication between the portable device 100 and the communication unit 200 installed in the vehicle 202. Next, when the authentication succeeds, the vehicle 202 becomes available for the user by unlocking a door lock of the vehicle 202 or starting an engine of the vehicle 202. The system 1 is also referred to as a smart entry system. Next, respective structural elements will be described sequentially.

(1) Portable Device 100

The portable device 100 is configured as any device to be carried by the user. Examples of the any device include an electronic key, a smartphone, a wearable terminal, and the like. As illustrated in FIG. 1, the portable device 100 includes a wireless communication section 110, a storage section 120, and a control section 130.

The wireless communication section 110 has a function of performing wireless communication with the communication unit 200 installed in the vehicle 202. The wireless communication section 110 receives a wireless signal from the communication unit 200 installed in the vehicle 202 and transmits the wireless signal.

For example, wireless communication is performed between the wireless communication section 110 and the communication unit 200 by using an ultra-wideband (UWB) signal, for example. In the wireless communication of the UWB signal, it is possible for impulse UWB to measure air propagation time of a radio wave with high accuracy by using the radio wave of ultra-short pulse width of a nanosecond or less, and it is possible to perform positioning and ranging with high accuracy on the basis of the propagation time. The wireless communication section 110 is configured as a communication interface that makes it possible to perform communication by using the UWB signals, for example.

Note that, the UWB signal may be transmitted/received as a ranging signal and a data signal. The ranging signal is a signal transmitted and received in the ranging process (to be described later). The ranging signal may be configured in a frame format that does not include a payload part for storing data or in a frame format that includes the payload part. On the other hand, the data signal is preferably configured in the frame format that includes the payload part for storing the data.

Here, the wireless communication section 110 includes at least one antenna 111. In addition, the wireless communication section 110 transmits/receives a wireless signal via the at least one antenna 111.

The storage section 120 has a function of storing various kinds of information for operating the portable device 100. For example, the storage section 120 stores a program for operating the portable device 100, and an identifier (ID), password, and authentication algorithm for authentication, or the like. For example, the storage section 120 includes a storage medium such as flash memory and a processing device that performs recording/playback on/of the storage medium.

The control section 130 has a function of executing processes in the portable device 100. As an example, the control section 130 controls the wireless communication section 110 to communicate with the communication unit 200 of the vehicle 202, reads information from the storage section 120, and writes information into the storage section 120. The control section 130 also functions as an authentication control section that controls an authentication process between the portable device 100 and the communication unit 200 of the vehicle 202. For example, the control section 130 may include a central processing unit (CPU) and an electronic circuit such as a microprocessor.

(2) Communication Unit 200

The communication unit 200 is prepared in association with the vehicle 202. Here, it is assumed that the communication unit 200 is installed in the vehicle 202 in such a manner that the communication unit 200 is installed in a vehicle interior of the vehicle 202, the communication unit 200 is built in the vehicle 202 as a communication module, or in other manners. Alternatively, the communication unit 200 may be prepared as a separate object from the vehicle 202 in such a manner that the communication unit 200 is installed in a parking space for the vehicle 202 or in other manners. In this case, the communication unit 200 may wirelessly transmit a control signal to the vehicle 202 on the basis of a result of communication with the portable device 100 and may remotely control the vehicle 202. As illustrated in FIG. 1, the communication unit 200 includes a wireless communication section 210, a storage section 220, and a control section 230.

The wireless communication section 210 has a function of performing wireless communication with the wireless communication section 110 of the portable device 100. The wireless communication section 210 receives a wireless signal from the portable device 100 and transmits a wireless signal to the portable device 100. The wireless communication section 210 is configured as a communication interface that makes it possible to perform communication by using the UWB signals, for example.

Here, the wireless communication section 210 includes at least one antenna 211. In addition, the wireless communication section 210 transmits/receives a wireless signal via the at least one antenna 211.

The storage section 220 has a function of storing various kinds of information for operating the communication unit 200. For example, the storage section 220 stores a program for operating the communication unit 200, an authentication algorithm, and the like. For example, the storage section 220 includes a storage medium such as flash memory and a processing device that performs recording/playback on/of the storage medium.

The control section 230 has a function of controlling overall operation performed by the communication unit 200 and in-vehicle equipment installed in the vehicle 202. As an example, the control section 230 controls the wireless communication section 210 to communicate with the portable device 100, reads information from the storage section 220, and writes information into the storage section 220. The control section 230 also functions as an authentication control section that controls the authentication process between the portable device 100 and the communication unit 200 of the vehicle 202. In addition, the control section 230 also functions as a door lock control section that controls the door key of the vehicle 202, and locks and unlocks doors with the door key. The control section 230 also functions as an engine control section that controls the engine of the vehicle 202, and starts/stops the engine. Note that, a motor or the like may be installed as a power source in the vehicle 202 in addition to the engine. For example, the control section 230 is configured as an electronic circuit such as an electronic control unit (ECU).

2. Technical Features

The smart entry system sometimes authenticates the portable device 100 on the basis of a relative positional relation between the portable device 100 and the communication unit 200. The relative positional relation is determined on the basis of a result of wireless communication between the portable device 100 and the communication unit 200 of the vehicle 202. However, accuracy of determining the positional relation tends to deteriorate in a situation where the radio propagation environment is not appropriate.

Examples of such a situation includes a case where the portable device 100 is out of line of sight from the antenna 211 such as the antenna 211 behind a pillar. In this case, accuracy of determining the positional relation deteriorates as received power decreases drastically.

Examples of such a situation include a situation where multipath is caused. The multipath is a situation where a receiver receives a plurality of radio waves transmitted from a single transmitter. Such a situation is created in the case where there are a plurality of paths between the transmitter and the receiver. In the situation where the multipath is caused, sometimes signals that have propagated through a plurality of different paths may interfere with each other and the accuracy of determining the position relation may deteriorate.

Even in a situation where the radio propagation environment is not appropriate, it is desired to prevent authentication error and assure its security. Therefore, according to the present embodiment, it is possible to control a process of determining a position of the portable device 100 in accordance with a radio propagation environment. This makes it possible to improve robustness against the radio propagation environment and assure security of the smart entry system. Next, technical features of the present embodiment will be described in detail.

<2.1. CIR Calculation Process>

The portable device 100 and the communication unit 200 according to the present embodiment may calculate a channel impulse response (CIR) indicating characteristics of a wireless communication path between the portable device 100 and the communication unit 200.

In this specification, the CIR is calculated when one (hereinafter, referred to as a transmitter) of the portable device 100 and the communication unit 200 transmits a wireless signal including a pulse and the other (hereinafter, referred to as a receiver) receives the wireless signal. More specifically, in this specification, the CIR is a correlation calculation result obtained by correlating a wireless signal transmitted from the transmitter (hereinafter, also referred to as a transmission signal) with a wireless signal received by the receiver (hereinafter, also referred to as a reception signal) at every delay time that is time elapsed after transmission of the transmission signal.

The receiver calculates the CIR by correlating the transmission signal with the reception signal through sliding correlation. Specifically, the receiver calculates a value obtained by correlating the reception signal with the transmission signal delayed by a certain delay time, as characteristics (hereinafter, referred to as a CIR value) at the delay time. Next, the receiver calculates the CIR value at each delay time to calculate the CIR. In other words, the CIR is chronological variation in the CIR values. Here, the CIR values are complex numbers each of which includes I and Q components. Sometimes a sum of squares of the I component and Q component of the CIR value may be referred to as an electric power value of the CIR. Note that, the CIR value is referred to as delay profile in a ranging technology using the UWB. In addition, in the ranging technology using the UWB, the sum of squares of the I component and Q component of the CIR value is also referred to as power delay profile.

Hereinafter, with reference to FIG. 2 to FIG. 3, a CIR calculation process performed in the case where the portable device 100 serves as the transmitter and the communication unit 200 serves as the receiver will be described in detail.

Figure 2:
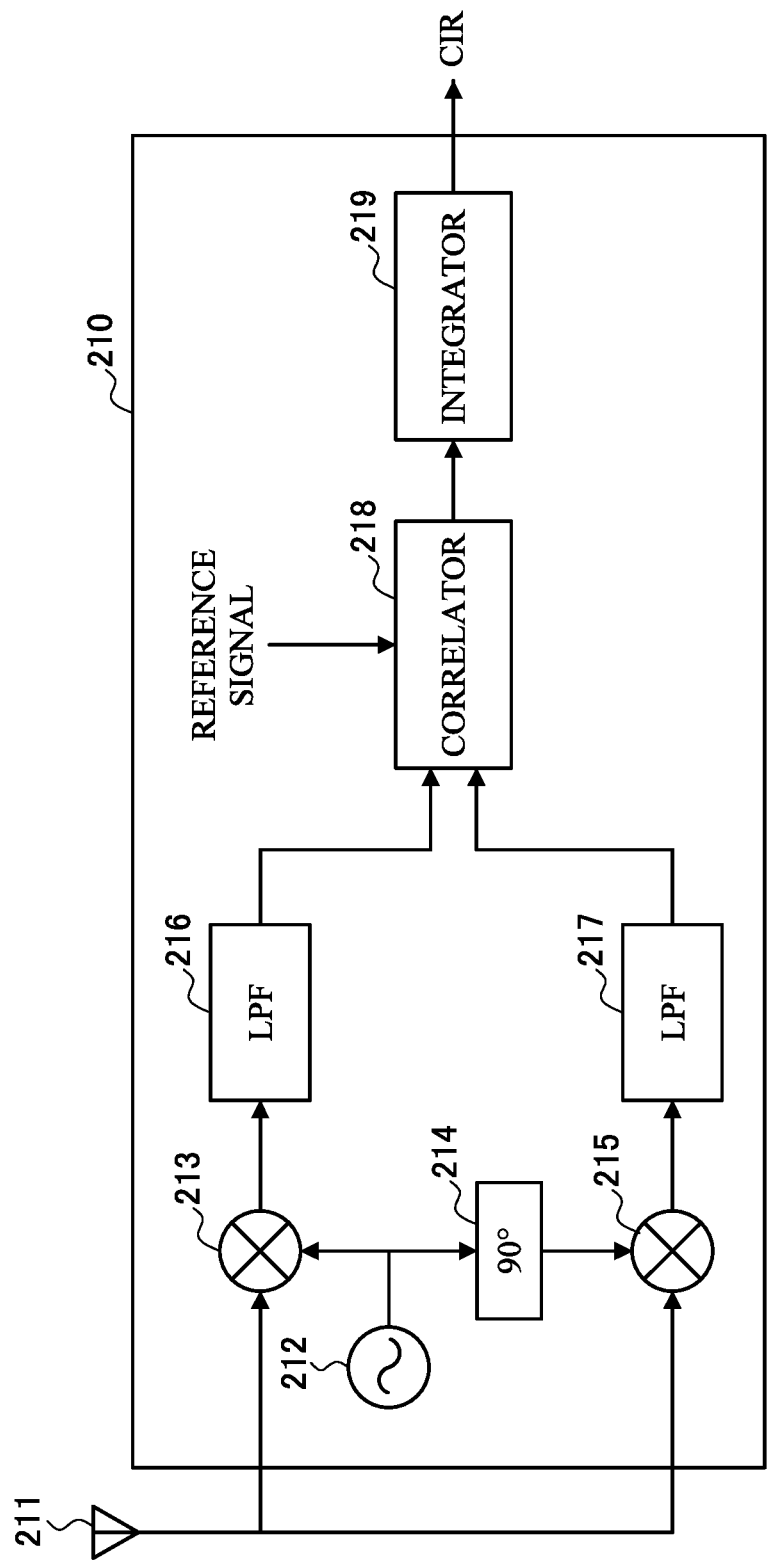
FIG. 2 is a diagram illustrating an example of processing blocks of a wireless communication section according to the embodiment.

FIG. 2 is a diagram illustrating an example of processing blocks of the wireless communication section 210 according to the present embodiment. As illustrated in FIG. 2, the wireless communication section 210 includes an oscillator 212, a multiplier 213, a 90-degree phase shifter 214, a multiplier 215, a low pass filter (LPF) 216, a LPF 217, a correlator 218, and an integrator 219.

The oscillator 212 generates a signal of same frequency as frequency of a carrier wave that carries a transmission signal, and outputs the generated signal to the multiplier 213 and the 90-degree phase shifter 214.

The multiplier 213 multiplies a reception signal received by the antenna 211 and the signal output from the oscillator 212, and outputs a result of the multiplication to the LPF 216. Among input signals, the LPF 216 outputs a signal of lower frequency than the frequency of the carrier wave that carries the transmission signal, to the correlator 218. The signal input to the correlator 218 is an I component (that is, a real part) among components corresponding to an envelope of the reception signal.

The 90-degree phase shifter 214 delays the phase of the input signal by 90 degrees, and outputs the delated signal to the multiplier 215. The multiplier 215 multiplies the reception signal received by the antenna 211 and the signal output from the 90-degree phase shifter 214, and outputs a result of the multiplication to the LPF 217. Among input signals, the LPF 217 outputs a signal of lower frequency than the frequency of the carrier wave that carries the transmission signal, to the correlator 218. The signal input to the correlator 218 is a Q component (that is, an imaginary part) among the components corresponding to the envelope of the reception signal.

The correlator 218 calculates the CIR by correlating a reference signal with the reception signals including the I component and the Q component output from the LPF 216 and the LPF 217 through the sliding correlation. Note that, the reference signal described herein is the same signal as the transmission signal before multiplying the carrier wave.

The integrator 219 integrates the CIRs output from the correlator 218, and outputs the integrated CIRs.

Note that, the wireless communication section 210 performed the above-described processes on respective reception signals received by a plurality of the antennas 211.

Figure 3:
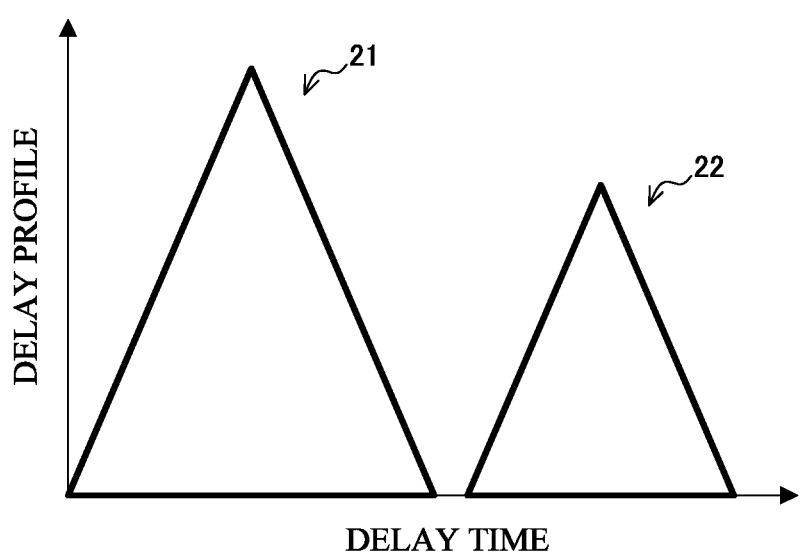
FIG. 3 is a graph illustrating an example of CIR according to the embodiment.

FIG. 3 illustrates an example of the CIRs output from the integrator 219. FIG. 3 is a graph illustrating the example of CIRs according to the present embodiment. The graph includes a horizontal axis representing delay time, and a vertical axis representing delay profile. A piece of information included in information that changes chronologically, such as a CIR value obtained at a certain delay time among the CIRs, is also referred to as a sampling point. Typically, a set of sampling points obtained between a zero-crossing and another zero-crossing corresponds to a single pulse with regard to the CIRs. The zero-crossing is the sampling point where the value is zero. However, the same does not apply to an environment with noise. For example, a set of sampling points obtained between intersections of a standard other than zero with the varied CIR values may be treated as corresponding to the single pulse. The CIRs illustrated in FIG. 3 include a set 21 of sampling points corresponding to a certain pulse, and a set 22 of sampling points corresponding to another pulse.

For example, the set 21 corresponds to a pulse of a first path. The first path is a shortest path between the transmitter and the receiver. In an environment that includes no obstacle, the first path is a straight-line distance between the transmitter and the receiver. The pulse of the first path is a pulse that reaches the receiver through the first path. For example, the set 22 corresponds to a pulse that reaches the receiver through a path other than the first path.

<2.2. Positional Parameter Estimation Process>

The communication unit 200 (specifically, control section 230) according to the present embodiment performs a positional parameter estimation process of estimating a positional parameter that represents a position of the portable device 100. Hereinafter, with reference to FIG. 4 to FIG. 6, various definitions related to the positional parameter will be described.

Figure 4:
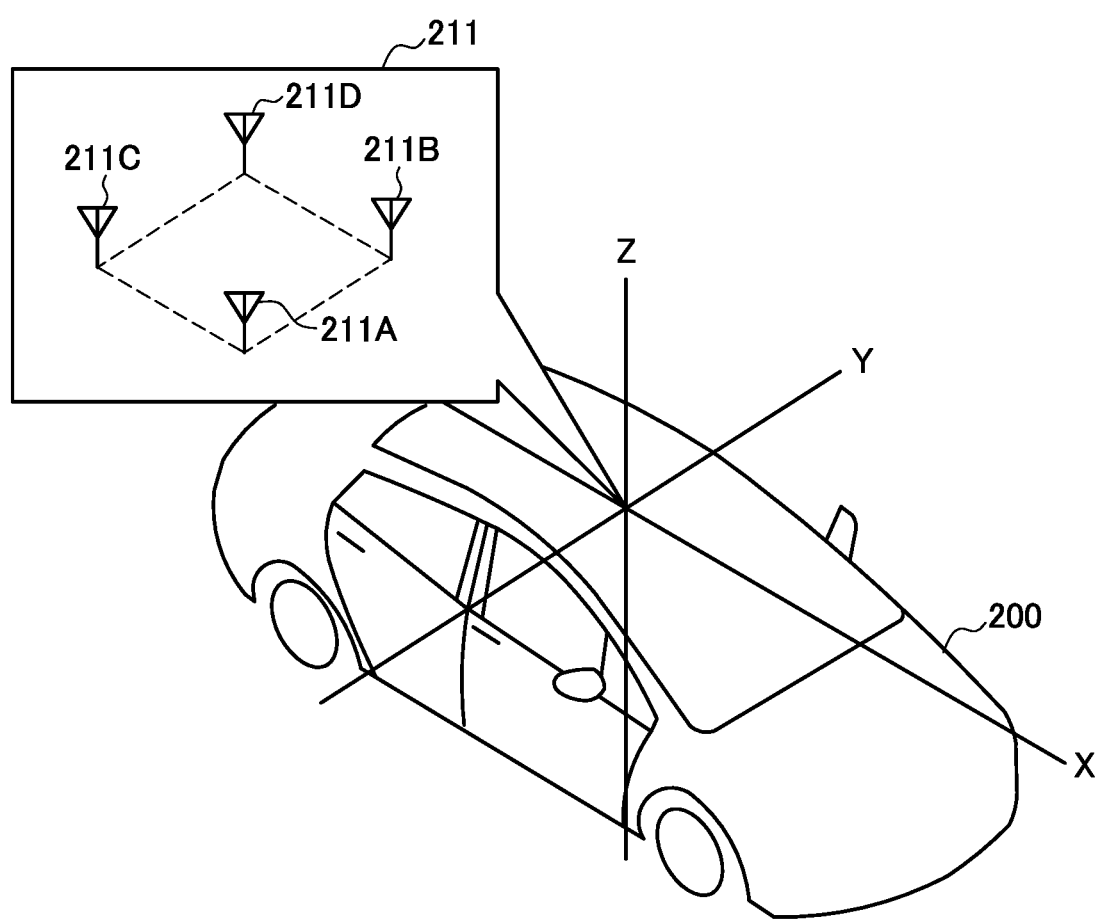
FIG. 4 is a diagram illustrating an example of arrangement of a plurality of antennas installed in a vehicle according to the embodiment.

FIG. 4 is a diagram illustrating an example of arrangement of the plurality of antennas 211 installed in the vehicle 202 according to the present embodiment. As illustrated in FIG. 4, the four antennas 211 (211A to 211D) are installed on a ceiling of the vehicle 202. The antenna 211A is installed on a front right side of the vehicle 202. The antenna 211B is installed on a front left side of the vehicle 202. The antenna 211C is installed on a rear right side of the vehicle 202. The antenna 211D is installed on a rear left side of the vehicle 202. Note that, a distance between adjacent antennas 211 are set to half or less of wavelength λ of an angle estimation signal (to be described later). A local coordinate system of the communication unit 200 has its origin at the center of the four antennas 211. This local coordinate system has its X axis along a front-rear direction of the vehicle 202, its Y axis along a left-right direction of the vehicle 202, and its Z axis along an up-down direction of the vehicle 202. Note that, the X axis is parallel to a line connecting a pair of the antennas in the front-rear direction (such as a pair of the antenna 211A and the antenna 211C, and a pair of the antenna 211B and the antenna 211D). In addition, the Y axis is parallel to a line connecting a pair of the antennas in the left-right direction (such as a pair of the antenna 211A and the antenna 211B, and a pair of the antenna 211C and the antenna 211D).

Note that, the arrangement of the four antennas is not limited to the square shape. The arrangement of the four antennas may be a parallelogram shape, a trapezoid shape, a rectangular shape, or any other shapes. Of course, the number of antennas 211 is not limited to four.

Figure 5:
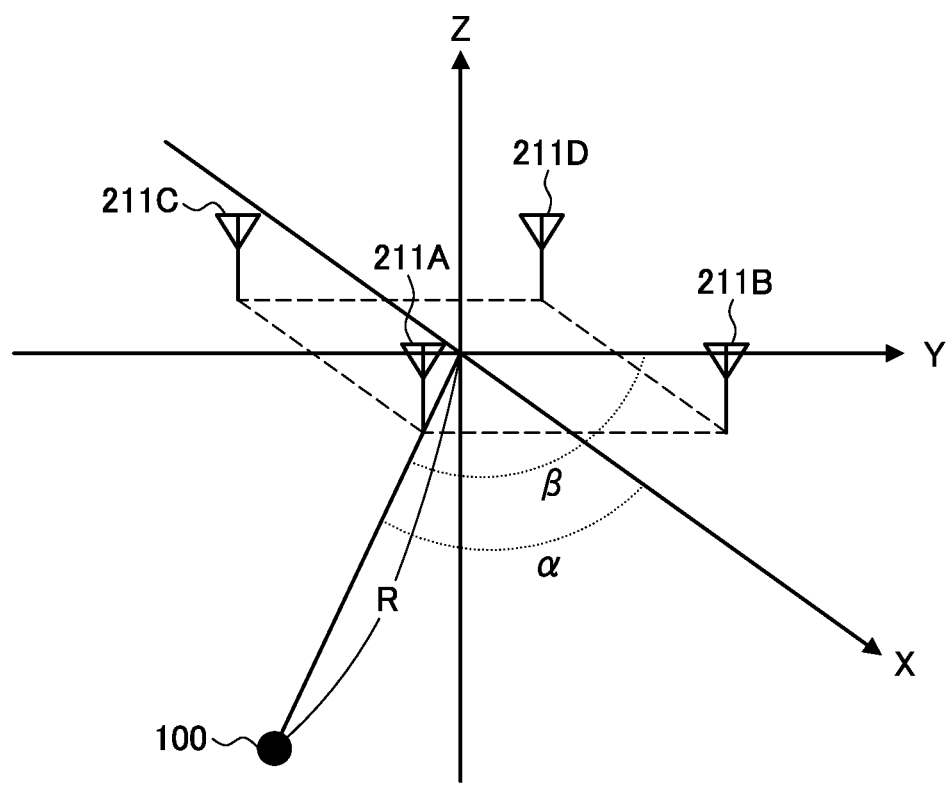
FIG. 5 is a diagram illustrating an example of a positional parameter of a portable device according to the embodiment.

FIG. 5 is a diagram illustrating an example of a positional parameter of the portable device 100 according to the present embodiment. The positional parameter may include a distance R between the portable device 100 and the origin of the local coordinate system of the communication unit 200 as illustrated in FIG. 5. The distance R corresponds to a distance between the portable device 100 and the communication unit 200. More specifically, the distance R is a distance to the portable device 100 based on one of the plurality of antennas 211 of the wireless communication section 210. The distance R is estimated on the basis of a result of transmission/reception of a ranging signal (to be described later) between the portable device 100 and the one of antennas 211.

In addition, the positional parameters may include an angle of the portable device 100 based on the communication unit 200, the angle including an angle α between the X axis and the portable device 100 and an angle β between the Y axis and the portable device 100. The angles α and β are angles between the coordinate axes and a straight line connecting the portable device 100 with the origin on a first predetermined coordinate system. For example, the first predetermined coordinate system is the local coordinate system. The angle α is an angle between the X axis and the straight line connecting the portable device 100 with the origin. The angle β is an angle between the Y axis and the straight line connecting the portable device 100 with the origin.

Figure 6:
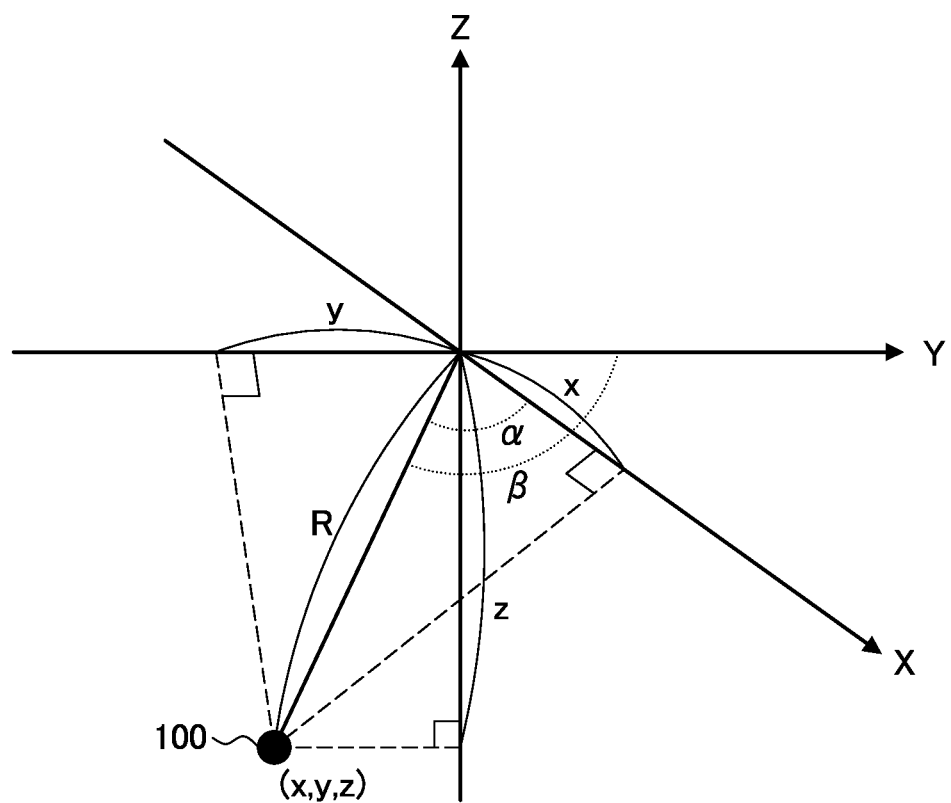
FIG. 6 is a diagram illustrating an example of a positional parameter of the portable device according to the embodiment.

FIG. 6 is a diagram illustrating an example of positional parameters of the portable device 100 according to the present embodiment. The positional parameters may include coordinates of the portable device 100 in a second predetermined coordinate system. In FIG. 6, a coordinate x on the X axis, a coordinate y on the Y axis, and a coordinate z on the Z axis of the portable device 100 are an example of such coordinates. In other words, the second predetermined coordinate system may be a local coordinate system. Alternatively, the second predetermined coordinate system may be a global coordinate system.

Next, the positional parameter estimation process according to the present embodiment will be described.

(1) Distance Estimation

The communication unit 200 performs the ranging process. The ranging process is a process of estimating a distance between the communication unit 200 and the portable device 100. For example, the distance between the communication unit 200 and the portable device 100 is the distance R illustrated in FIG. 5. The ranging process includes transmission/reception of the ranging signal and calculation of the distance R based on time taken to transmission/reception of the ranging signal.

In the ranging process, a plurality of the ranging signals may be transmitted and received between communication unit 200 and the portable device 100. Among the plurality of ranging signals, a ranging signal transmitted from one device to the other device is also referred to as a first ranging signal. Alternatively, a ranging signal transmitted as a response to the first ranging signal from the device that has received the first ranging signal to the device that has transmitted the first ranging signal is also referred to as a second ranging signal.

Next, with reference to FIG. 7, an example of a flow of the ranging process will be described.

Figure 7:
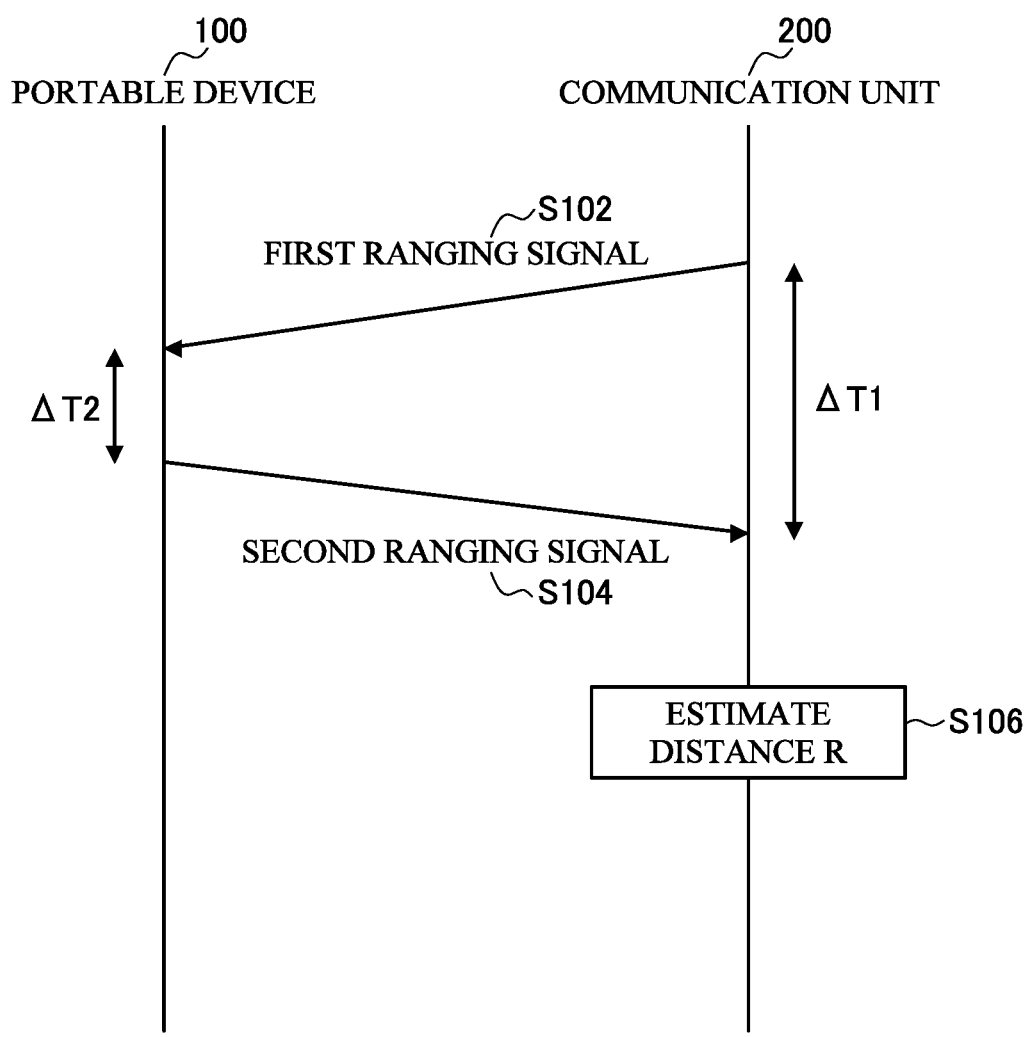
FIG. 7 is a sequence diagram illustrating an example of a flow of a measurement process executed in the system according to the embodiment.

FIG. 7 is a sequence diagram illustrating the example of the flow of the ranging process executed in the system 1 according to the present embodiment. The portable device 100 and the communication unit 200 are involved in this sequence. As illustrated in FIG. 7, the communication unit 200 first transmits the first ranging signal to the portable device 100 (Step S102). When the first ranging signal is received from the communication unit 200, the portable device 100 transmits the second ranging signal to the communication unit 200 in response to the first ranging signal (Step S104). When the second ranging signal is received from the portable device 100, the communication unit 200 estimates the distance R between the portable device 100 and the communication unit 200 (Step S106).

The distance R is estimated on the basis of a time period ΔT1 from time when the communication unit 200 transmits the first ranging signal to time when the communication unit 200 receives the second ranging signal, and a time period ΔT2 from time when the portable device 100 receives the first ranging signal to time when the portable device 100 transmits the second ranging signal. Specifically, time taken to transmit or receive a one-way signal is calculated by subtracting ΔT2 from ΔT1 and dividing the subtracted value by 2, and then the distance R between the portable deviceb100 and the communication unitb200 is calculated by multiplying the calculated time by speed of the signal.

Note that, the time period ΔT1 is measured by the communication unit 200. The time period ΔT2 may be measured by the portable device 100 and reported to the communication unit 200, or may be shared with the communication unit 200 in advance as a predetermined time period. In the latter case, the portable device 100 transmits the second ranging signal when the predetermined time period elapses after reception of the first ranging signal.

Here, time of receiving the ranging signal is time of receiving a pulse detected as a pulse of the first path among pulses transmitted as the ranging signal.

Hereinafter, the pulse detected as the pulse of the first path is also referred to as a first incoming wave. The first incoming wave may be any of a direct wave, a delayed wave, or a combined wave. The direct wave is a signal that passes through a shortest path between the transmitter and the receiver, and is directly received by the receiver (that is, without being reflected or the like). In other words, the direct wave is the pulse of the first path. The delayed wave is a signal that passes through a path other than the shortest path between the transmitter and the receiver, and is indirectly received by the receiver through reflection or the like. The delayed wave is received by the receiver after getting delayed in comparison with the direct wave. The combined wave is a signal received by the receiver in a state of combining a plurality of signals that have passed through a plurality of different paths.

The receiver detects a signal that meets a predetermined detection standard as the first incoming wave, among wireless signals received from the transmitter. For example, the predetermined detection standard is a condition that an electric power value of the CIR exceeds a predetermined threshold for the first time. In other words, the receiver may detect a pulse corresponding to a portion of the CIR obtained when the electric power value exceeds the predetermined threshold for the first time, as the first incoming wave. For another example, the predetermined detection standard is a condition that a reception electric power value of the received wireless signal (that is, the sum of squares of an I component and a Q component of the received signal) exceeds a predetermined threshold for the first time. In other words, the receiver may detect a pulse whose electric power value exceeds the predetermined threshold for the first time, as the first incoming wave among received pulses.

Here, it should be noted that the pulse detected as the first incoming wave is not necessarily the direct wave. If the direct wave is received in a state where the direct wave and the delayed wave annihilate each other, sometimes the electric power value of the CIR falls below the predetermined threshold and the direct wave is not detected. In this case, the combined wave or the delayed wave coming while being delayed behind the direct wave is detected as the first incoming wave. This changes (that is, delays) the time of receiving the pulse detected as the first incoming wave from the case of detecting the direct wave. This delay deteriorate ranging accuracy.

Note that, the receiver may treat the time of meeting the predetermined detection standard as the time of receiving the first incoming wave. In other words, the receiver may treat time when the electric power value of the CIR exceeds the predetermined threshold for the first time or time when the reception electric power value of the wireless signal exceeds the predetermined threshold for the first time, as the time of receiving the first incoming wave. Alternatively, the receiver may treat time of a peak of the detected first incoming wave (that is, time when the highest electric power value is obtained with regard to a portion of the CIR corresponding to the first incoming wave, or time when the highest reception electric power value is obtained with regard to the first incoming wave), as the time of receiving the first incoming wave.

(2) Angle Estimation

The communication unit 200 estimates the angles α and β illustrated in FIG. 5, through an angle estimation process. The angle estimation process includes reception of an angle estimation signal and calculation of the angles α and β on the basis of a result of reception of the angle estimation signal. The angle estimation signal is a signal used for estimating an angle among signals transmitted/received between the portable device 100 and the communication unit 200. Next, with reference to FIG. 8, an example of a flow of the angle estimation process will be described.

Figure 8:
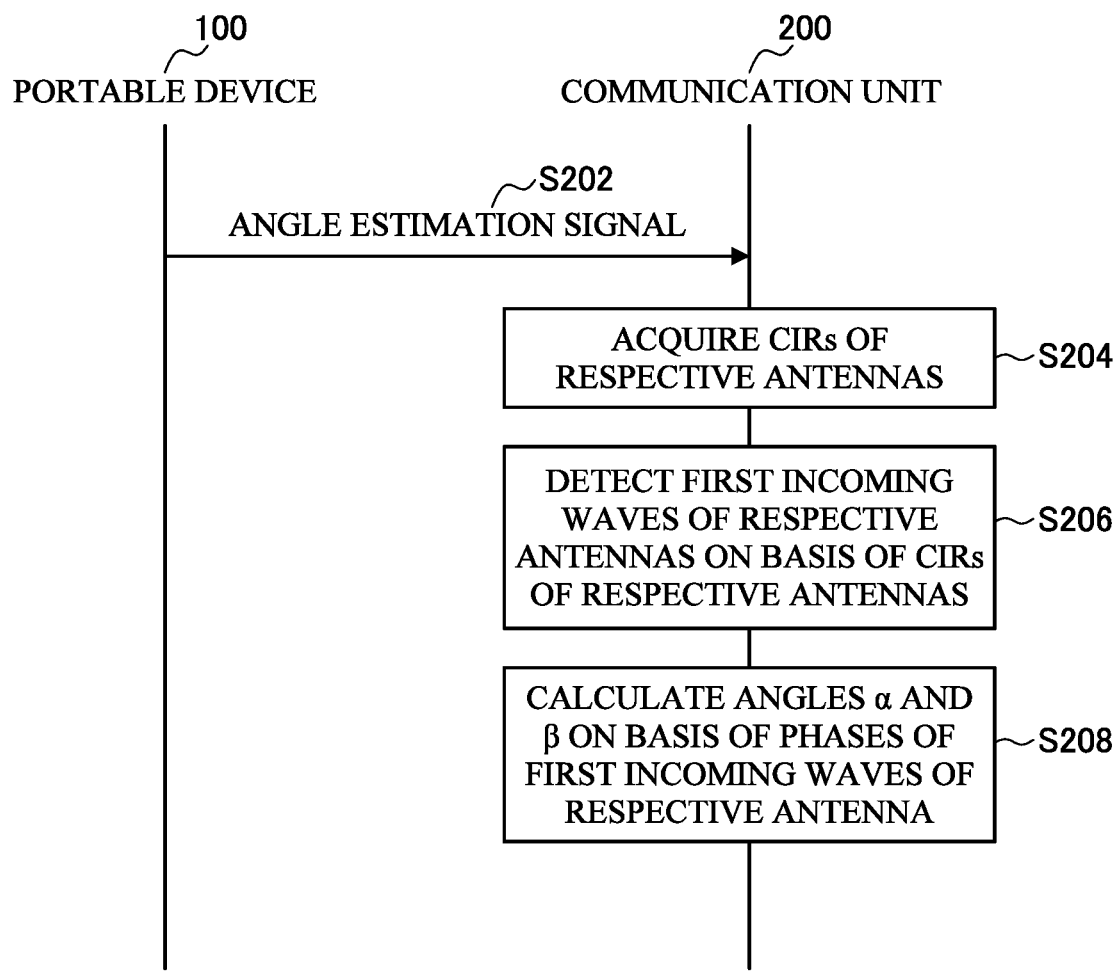
FIG. 8 is a sequence diagram illustrating an example of a flow of an angle estimation process executed in the system according to the embodiment.

FIG. 8 is a sequence diagram illustrating the example of the flow of the angle estimation process executed in the system 1 according to the present embodiment. As illustrated in FIG. 8, the portable device 100 first transmits the angle estimation signal to the communication unit 200 (Step S202). Next, the communication unit 200 acquires CIRs of the respective antennas 211 (Step S204). Next, the communication unit 200 detects first incoming waves of the respective antennas 211 on the basis of the CIRs of the respective antennas 211 (Step S206). Next, the communication unit 200 calculates the angles α and β on the basis of phases of the first incoming waves of the respective antennas 211 (Step S208).

Here, the phases of the first incoming waves may be phases obtained at times of receiving the first incoming waves among the received wireless signals. Alternatively, the phases of the first incoming waves may be phases obtained at times of receiving the first incoming waves among the CIRs.

Note that, the angle estimation signal may be transmitted/received during the angle estimation process, or at any other timings. For example, the angle estimation signal may be transmitted/received during the ranging process. Specifically, the angle estimation signal illustrated in FIG. 8 may be the same as the second ranging signal illustrated in FIG. 7. In this case, it is possible for the communication unit 200 to calculate the distance R, the angle α, and the angle β by receiving a single wireless signal that serves as both the angle estimation signal and the second ranging signal.

Next, details of a process in Step S208 will be described. It is assumed that $P_A$ represents a phase of the first incoming wave received by the antenna 211A, $P_B$ represents a phase of the first incoming wave received by the antenna 211B, $P_C$ represents a phase of the first incoming wave received by the antenna 211C, and $P_D$ represents a phase of the first incoming wave received by the antenna 211D. In this case, antenna array phase differences $Pd_{AC}$ and $Pd_{BD}$ in the X axis direction and antenna array phase differences $Pd_{BA}$ and $Pd_{DC}$ in the Y axis direction are expressed in respective equations listed below.

$$Pd_{AC}=(P_A-P_C)$$

$$Pd_{BD}=(P_B-P_D)$$

$$Pd_{DC}=(P_D-P_C)$$

$$Pd_{BA}=(P_B-P_A) \qquad (1)$$

The angles α and β are calculated by using the following equation. Here, λ represents wavelength of a radio wave, and d represents a distance between antennas 211.

$$\alpha \text{ or } \beta=\arccos(\lambda \cdot Pd/(2\cdot\pi\cdot d)) \qquad (2)$$

Therefore, respective equations listed below represent angles calculated on the basis of the respective antenna array phase differences.

$$\alpha_{AC}=\arccos(\lambda \cdot Pd_{AC}/(2\cdot\pi\cdot d))$$

$$\alpha_{BD}=\arccos(\lambda \cdot Pd_{BD}/(2\cdot\pi\cdot d))$$

$$\beta_{DC}=\arccos(\lambda \cdot Pd_{DC}/(2\cdot\pi\cdot d))$$

$$\beta_{BA}=\arccos(\lambda \cdot Pd_{BA}/(2\cdot\pi\cdot d)) \qquad (3)$$

The communication unit 200 calculates the angles α and β on the basis of the calculated angles $\alpha_{AC}$, $\alpha_{BD}$, $\beta_{DC}$, and $\beta_{BA}$. For example, as expressed in the following equations, the communication unit 200 calculates the angles α and β by averaging the angles calculated with regard to the two respective arrays in the X axis direction and the Y axis direction.

$$\alpha=(\alpha_{AC}+\alpha_{BD})/2$$

$$\beta=(\beta_{DC}+\beta_{BA})/2 \qquad (4)$$

As described above, the angles α and β are calculated on the basis of the phases of the first incoming waves. In the case where the first incoming waves are delayed waves or combined waves, sometimes phases of the delayed waves and the combined waves may differ from phases of direct waves. This difference deteriorates accuracy of angle estimation.

(3) Coordinate Estimation

The communication unit 200 estimates three-dimensional coordinates (x, y, z) of the portable device 100 illustrated in FIG. 6, through a coordinate estimation process.

First Calculation Method

The communication unit 200 may calculate the coordinates x, y, and z on the basis of results of the ranging process and the angle estimation process. In this case, the communication unit 200 first calculates the coordinates x and y by using equations listed below.

$$x=R\cdot\cos\alpha$$

$$y=R\cdot\cos\beta \qquad (5)$$

Here, the distance R, the coordinate x, the coordinate y, and the coordinate z have a relation represented by an equation listed below.

$$R=\sqrt{x^2+y^2+z^2} \qquad (6)$$

The communication unit 200 calculates the coordinate z by using the above-described relation and an equation listed below.

$$z=\sqrt{R^2-R^2\cdot\cos^2\alpha-R\cdot\cos^2\beta} \qquad (7)$$

Second Calculation Method

The communication unit 200 may omit the angle estimation process, and calculate the coordinates x, y, and z on the basis of a result of the ranging process. First, the above-listed equations (3), (4), (5), and (6) establish a relation represented by equations listed below.

$$x/R=\cos(\alpha) \qquad (8)$$

$$y/R=\cos(\beta) \qquad (9)$$

$$d\cdot\cos(\alpha)=\lambda\cdot(Pd_{AC}/2+Pd_{BD}/2)/(2\cdot\pi) \qquad (10)$$

$$d\cdot\cos(\beta)=\lambda\cdot(Pd_{DC}/2+Pd_{BA}/2)/(2\cdot\pi). \qquad (12)$$

The equation (11) is rearranged for cos(α), and cos(α) is substituted into the equation (8). This makes it possible to obtain the coordinate x by using an equation listed below.

$$x=R\cdot\lambda\cdot(Pd_{AC}/2+Pd_{BD}/2)/(2\cdot\pi d) \qquad (13)$$

The equation (12) is rearranged for cos(β), and cos(β) is substituted into the equation (9). This makes it possible to obtain the coordinate y by using an equation listed below.

$$y=R\cdot\lambda\cdot(Pd_{DC}/2+Pd_{BA}/2)/(2\cdot\pi d) \qquad (14)$$

Next, the equation (13) and the equation (14) are substituted into the equation (10), and the equation (10) is rearranged. This makes it possible to obtain the coordinate x by using an equation listed below.

$$z=\sqrt{R^2-x^2-y^2} \qquad (15)$$

The process of estimating the coordinates of the portable device 100 in the local coordinate system has been described above. It is possible to estimate coordinates of the portable device 100 in the global coordinate system by combining the coordinates of the portable device 100 in the local coordinate system and coordinates of the origin in the local coordinate system relative to the global coordinate system.

<2.3. Reliability Parameter>

The communication unit 200 (specifically, control section 230) according to the present embodiment calculates a reliability parameter. The reliability parameter is an indicator indicating whether the first incoming wave detected as a signal that meets the predetermined detection standard is an appropriate processing target among the wireless signals received by the wireless communication section 210. The first incoming wave is used for estimating the positional parameter in the above-described positional parameter estimation process. Therefore, it is possible to evaluate accuracy of estimating the positional parameter on the basis of the reliability parameter. For example, the reliability parameters are continuous values or discrete values. A higher value may indicate that the first incoming wave is the appropriate processing target, and a lower value may indicate that the first incoming wave is an inappropriate processing value, and vice versa. Hereinafter, a degree of appropriateness of the first incoming wave as the processing target may also be referred to as reliability. In addition, high reliability means that the first incoming wave is appropriate for the processing target, and low reliability means that the first incoming wave is inappropriate as the processing target.

Next, examples of the reliability parameter will be described. The reliability parameter includes at least any of first to seventh reliability parameters described below.

First Reliability Parameter

The first reliability parameter is an indicator that indicates whether the first incoming wave itself is the appropriate detection target. Higher reliability is obtained as the first incoming wave is more appropriate for the detection target, and lower reliability is obtained as the first incoming wave is more inappropriate for the detection target.

Specifically, the first reliability parameter may be an indicator that indicates magnitude of noise. In this case, the first reliability parameter is calculated on the basis of at least any of a signal-to-noise ratio (SNR) and an electric power value of the first incoming wave. In the case where the electric power value is high, effects of the noise are small. Therefore, the first reliability parameter indicating that the first incoming wave is appropriate for the detection target is calculated. On the other hand, in the case where the electric power value is low, effects of the noise are large. Therefore, the first reliability parameter indicating that the first incoming wave is inappropriate for the detection target is calculated. In the case where the SNR is high, effects of the noise are small. Therefore, the first reliability parameter indicating that the first incoming wave is appropriate for the detection target is calculated. On the other hand, in the case where the SNR is low, effects of the noise are large. Therefore, a first reliability parameter indicating that the first incoming wave is appropriate for the detection target is calculated.

By using the first reliability parameter, it is possible to evaluate reliability on the basis of whether the first incoming wave itself is appropriate for the detection target.

Second Reliability Parameter

The second reliability parameter is an indicator that indicates suitability of a direct wave for the first incoming wave. Higher reliability is obtained as the suitability of the direct wave for the first incoming wave gets higher, and lower reliability is obtained as the suitability of the direct wave for the first incoming wave gets lower.

The second reliability parameter may be calculated on the basis of consistency between the respective first incoming waves of the plurality of antennas 211 of the wireless communication section 210. Specifically, the second reliability parameter is calculated on the basis of at least any of a reception time and an electric power value of the first incoming wave with regard to each of the plurality of antennas 211 of the wireless communication section 210. By the effect of multipath, a plurality of wireless signals came through different paths may be combined and received by the antennas 211 in a state where the signals are amplified or offset. Next, in the case where ways of amplifying and offsetting the wireless signals are different between the plurality of antennas 211, different reception times and different electric power values may be obtained with regard to the first incoming waves between the plurality of antennas 211. When considering that distances between the antennas 211 are short distances that are half or less of the wave length $\lambda$ of the angle estimation signal, a large difference in reception times and electric power values of the first incoming waves between the plurality of antennas 211 means low suitability of direct waves for the first incoming waves.

Therefore, a second reliability parameter is calculated in such a manner that the second reliability parameter indicates that the suitability of a direct waves for the first incoming waves gets lower as the difference in reception time between the first incoming waves gets larger. On the other hand, a second reliability parameter is calculated in such a manner that the second reliability parameter indicates that the suitability of a direct waves for the first incoming waves gets higher as the difference in reception time between the first incoming waves gets smaller. In addition, a second reliability parameter is calculated in such a manner that the second reliability parameter indicates that the suitability of direct waves for the first incoming waves gets lower as the difference in electric power values between the first incoming waves gets larger. On the other hand, a second reliability parameter is calculated in such a manner that the second reliability parameter indicates that the suitability of the direct waves for the first incoming waves gets higher as the difference in electric power values between the first incoming waves gets smaller.

The second reliability parameter is calculated on the basis of consistency between positional parameters indicating positions of the portable device 100 estimated on the basis of the respective first incoming waves received by the plurality of antenna pairs, each of which includes two different antennas 211 among the plurality of antennas 211 of the wireless communication section 210. Here, the positional parameters are the angles $\alpha$ and $\beta$ illustrated in FIG. 5 and the coordinates (x, y, z) illustrated in FIG. 6. In the case where the first incoming waves are the direct waves, same or substantially same results are obtained with regard to the angles $\alpha$ and $\beta$ and the coordinates (x, y, z) even if different combinations are used as the antenna pair for calculating the angles $\alpha$ and $\beta$ and the coordinates (x, y, z). However, in the case where the first incoming waves are not the direct waves, different results may be obtained with regard to the angles $\alpha$ and $\beta$ and the coordinates (x, y, z) between different combinations of the antenna pairs.

Accordingly, a second reliability parameter is calculated in such a manner that the second reliability parameter indicates that the suitability of the direct waves for the first incoming waves gets higher as the difference in positional parameter calculation result between different combinations of the antenna pairs gets smaller. For example, a second reliability parameter is calculated in such a manner that the second reliability parameter indicates that the suitability of the direct waves for the first incoming waves gets higher as an error between $\alpha_{AC}$ and $\alpha_{BD}$ gets smaller and as an error between $\beta_{DC}$ and $\beta_{BA}$ gets smaller. On the other hand, a second reliability parameter is calculated in such a manner that the second reliability parameter indicates that the suitability of the direct waves for the first incoming waves gets lower as the difference in positional parameter calculation result between different combinations of the antenna pairs gets larger. For example, the second reliability parameter is calculated in such a manner that the second reliability parameter indicates that the suitability of direct waves for the first incoming waves gets lower as an error between $\alpha_{AC}$ and $\alpha_{BD}$ gets larger and as an error between $\beta_{DC}$ and $\beta_{BA}$ gets larger. These angles have been described above with regard to the angle estimation process.

By using the second reliability parameter, it is possible to evaluate the reliability on the basis of the suitability of the direct waves for the first incoming waves.

Third Reliability Parameter

The third reliability parameter is an indicator that indicates unsuitability of a combined wave for the first incoming wave. Higher reliability is obtained as the unsuitability of the combined wave for the first incoming wave gets higher, and lower reliability is obtained as the unsuitability of the combined wave for the first incoming wave gets lower.

Specifically, the third reliability parameter is calculated on the basis of at least any of width of the first incoming wave in a time direction and a state of a phase of the first incoming wave.

First, with reference to FIG. 9, calculation of the third reliability parameter based on the width of the first incoming wave in the time direction will be described. Here, the width of the first incoming wave in the time direction may be width of a portion corresponding to the first incoming wave in the time direction, with regard to chronological variation in the reception electric power value of the wireless signal. Alternatively, the width of the first incoming wave in the time direction may be width of a portion corresponding to the first incoming wave in the time direction, with regard to the CIR.

Figure 9:
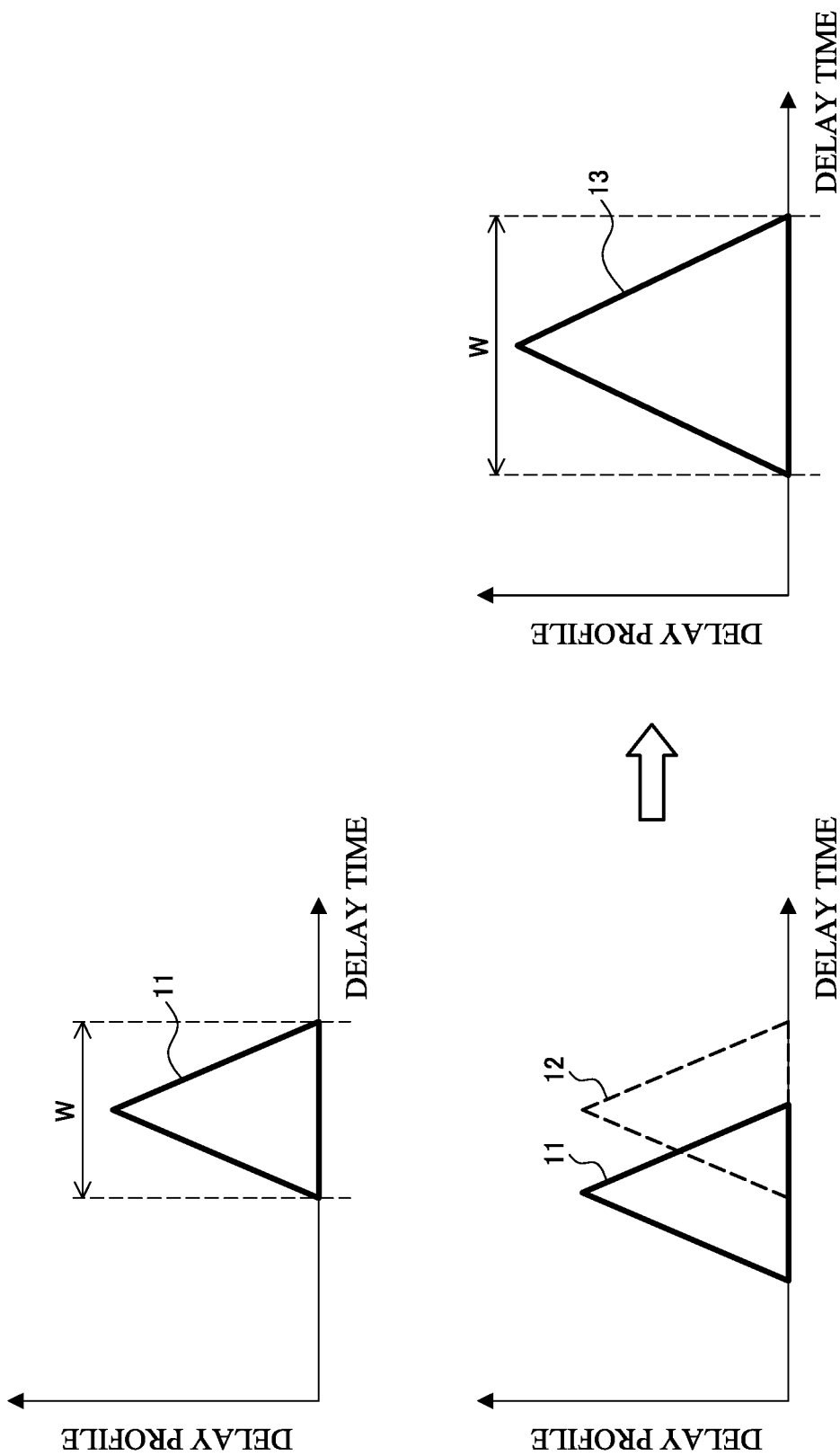
FIG. 9 is a diagram for describing an example of a reliability parameter according to the embodiment.

FIG. 9 is diagrams for describing examples of the reliability parameter according to the present embodiment. In the case where a direct wave is independently received as illustrated in the top of FIG. 9, width W of a portion 11 corresponding to the direct wave in the CIR serves as an ideal width obtained when only the direct wave is detected as the first incoming wave. Here, the width W is width of a set of sampling points corresponding to a single pulse in the time direction. For example, the width W is width between a zero-crossing and another zero-crossing. For another example, the width W is width between intersections of a standard other than zero with the varied CIR values. The ideal width obtained when only the direct wave is detected as the first incoming wave can be calculated through theoretical calculation using waveform of the transmission signal, a reception signal processing method, and the like. On the other hand, when the antennas 211 receive the plurality of wireless signals came through different paths in a state where the plurality of wireless signals are combined, width W of a portion corresponding to the combined wave in the CIR may be different from the ideal width obtained when only the direct wave is detected as the first incoming wave, due to effects of multipath. For example, when a delayed wave having a same phase as the direct wave is received in such a manner that the delayed wave is combined with the direct wave as illustrated in the bottom of FIG. 9, a portion 11 corresponding to the direct wave and a portion corresponding to the delayed wave are added in a state where they are shifted in the time direction. Therefore, a portion 13 corresponding to a combined wave in the CIR has a wide width W. On the other hand, when a delayed wave having an opposite phase from the direct wave is received in such a manner that the delayed wave is combined with the direct wave, the direct wave and the delayed wave annihilate each other. Therefore, a portion corresponding to a combined wave in the CIR has a narrow width W.

As described above, the third reliability parameter is calculated in such a manner that the third reliability parameter indicates that the unsuitability of the combined wave for the first incoming wave gets higher as the difference between the width of the first incoming wave and the ideal width obtained when only the direct wave is detected as the first incoming wave gets smaller. On the other hand, the third reliability parameter is calculated in such a manner that the third reliability parameter indicates that the unsuitability of the combined wave for the first incoming wave gets lower as the difference between the width of the first incoming wave and the ideal width obtained when only the direct wave is detected as the first incoming wave gets larger.

Next, with reference to FIG. 10, calculation of the third reliability parameter based on a state of phase of the first incoming wave will be described. Here, the state of the phase of the first incoming wave may be a degree of difference in phase between a plurality of sampling points corresponding to the first incoming wave among the received wireless signal. Alternatively, the state of the phase of the first incoming wave may be a degree of difference in phase between a plurality of sampling points corresponding to the first incoming wave among the CIR.

FIG. 10 is diagrams for describing examples of the reliability parameter according to the present embodiment. In the case where only the direct wave is received as illustrated in the top of FIG. 10, respective phases θ of a plurality of sampling points belonging to the portion 11 corresponding to the direct wave among the CIR s are a same or substantially same phase (that is, θ1≈θ2≈θ3). Note that, the phase is an angle between IQ components of a CIR and an I axis on an IQ plane. This is because distances of paths of direct waves at the respective sampling points are the same. On the other hand, in the case where the combined wave is received as illustrated in the bottom of FIG. 10, respective phases θ of a plurality of sampling points belonging to the portion 13 corresponding to the combined wave among the CIR are different phases (that is, θ1≠θ2≠θ3). This is because pulses passed different distances between the transmitter and the receiver, that is, the pulses having different phases are combined. As described above, the third reliability parameter is calculated in such a manner that the third reliability parameter indicates that the unsuitability of the combined wave for the first incoming wave gets higher as the difference between the phases of the plurality of sampling points corresponding to the first incoming wave gets smaller. On the other hand, the third reliability parameter is also calculated in such a manner that the third reliability parameter indicates that the unsuitability of the combined wave for the first incoming wave gets lower as the difference between the phases of the plurality of sampling points corresponding to the first incoming wave gets larger.

By using the third reliability parameter, it is possible to evaluate the reliability on the basis of the unsuitability of the combined wave for the first incoming wave.

Fourth Reliability Parameter

The fourth reliability parameter is an indicator that indicates suitability of a situation of receiving the wireless signal. Higher reliability is obtained when the suitability of a situation of receiving the wireless signal is higher, and lower reliability is obtained when the suitability of a situation of receiving the wireless signal is lower.

The fourth reliability parameter is calculated on the basis of variation of the plurality of first incoming waves. Specifically, the fourth reliability parameter is calculated on the basis of an amount of statistics that indicates variation in the plurality of first incoming waves such as dispersion of the electric power values of the first incoming waves, and amounts of change and dispersion in the estimated positional parameters (distance R, angles α and β, and coordinates (x, y, z)). Note that, the amount of change means integration of a difference between the positional parameter estimated based on one of the plurality of first incoming waves and the positional parameter estimated based on the next one of the plurality of first incoming waves, a difference between a maximum value and a minimum value of the positional parameter estimated with regard to each first incoming wave, or the like. As the dispersion and the amount of change get larger, environmental change increases in a time period of receiving the wireless signal multiple times. Therefore, a fourth reliability parameter is calculated in such a manner that the fourth reliability parameter indicates that suitability of a state of receiving a wireless signal gets higher as the dispersion and the amount of change gets smaller. On the other hand, the fourth reliability parameter is calculated in such a manner that the fourth reliability parameter indicates that suitability of a state of receiving a wireless signal gets lower as the dispersion and the amount of change gets larger. In addition, examples of the amount of statistics indicating variation in the plurality of first incoming waves includes a phase difference Pd between the first incoming waves, a width W of the first incoming wave in the time direction, a state of a phase θ of the first incoming wave, and an amount of change and dispersion of SNR of the first incoming wave.

By using the fourth reliability parameter, it is possible to evaluate the reliability on the basis of the suitability of the state of receiving the wireless signal. Specifically, it is possible to determine that higher reliability is obtained as environmental change decreases in the time period of receiving the wireless signal multiple times, and lower reliability is obtained as the environmental change increases. In addition, it is possible to determine that higher reliability is obtained in a low noise situation, and lower reliability is obtained in a high noise situation.

Supplementary Explanation

Hereinafter, supplementary explanation will be given to describe fifth and subsequent reliability parameters.

Hereinafter, each of the plurality of sampling points included in the CIR may also be referred to as an element. In other words, the CIR includes CIR values obtained at each delay time as the element. In addition, the shape of CIR, more specifically, the shape of chronological change in the CIR value may also be referred to as a CIR waveform.

Hereinafter, a certain element may be referred to as a specific element among a plurality of the elements included in the CIR. The specific element is an element corresponding to the first incoming wave. The specific element is detected in accordance with a predetermined detection standard, which has been described above with regard to the first incoming waves. For example, the specific element is an element whose amplitude or electric power of the CIR value exceeds a predetermined threshold for the first time, among the plurality of elements included in the CIR. Hereinafter, such a predetermined threshold may also be referred to as a first path threshold.

Time corresponding to delay time of the specific element serves as time of receiving the first incoming wave and is used for ranging. In addition, the phase of the specific element serves as the phase of the first incoming wave and is used for angle estimation.

The plurality of antennas 211 may include both an antenna 211 in a line-of-sight (LOS) condition and an antenna 211 in a non-line-of-sight (NLOS) condition.

The LOS condition means that the antenna 111 of the portable device 100 and the antenna 211 of the wireless communication section 210 are visible from each other. In the case of the LOS condition, a highest reception electric power of the direct wave is obtained. Therefore, there is a high possibility that the receiver succeeds in detecting the direct wave as the first incoming wave.

The NLOS condition means that the antenna 111 of the portable device 100 and the antenna 211 of the wireless communication section 210 are not visible from each other. In the case of the NLOS condition, reception electric power of the direct wave may become lower than the others. Therefore, there is a possibility that the receiver fails in detecting the direct wave as the first incoming wave.

In the case where the antenna 211 is in the NLOS condition, reception electric power of the direct wave is smaller than noise among signals came from the portable device 100. Accordingly, even if detection of the direct wave as the first incoming wave is successful, the phase and reception time of the first incoming wave may be changed due to an effect of the noise. In this case, accuracy of ranging and accuracy of angle estimation deteriorate.

In addition, in the case where the antenna 211 is in the NLOS condition, reception electric power of the direct wave becomes lower than the case where the antenna 211 is in the LOS condition, and detection of the direct wave as the first incoming wave may end in failure. In this case, accuracy of ranging and accuracy of angle estimation deteriorate.

Fifth Reliability Parameter

The reliability parameter may include a fifth reliability parameter that is a difference between delay time of a first element and delay time of a second element of the CIR. The first element has a peak CIR value for the first time after the specific element, and the second element has the peak CIR value for the second time after the specific element. Details of the fifth reliability parameter will be described with reference to FIG. 11 and FIG. 12.

Figure 11:
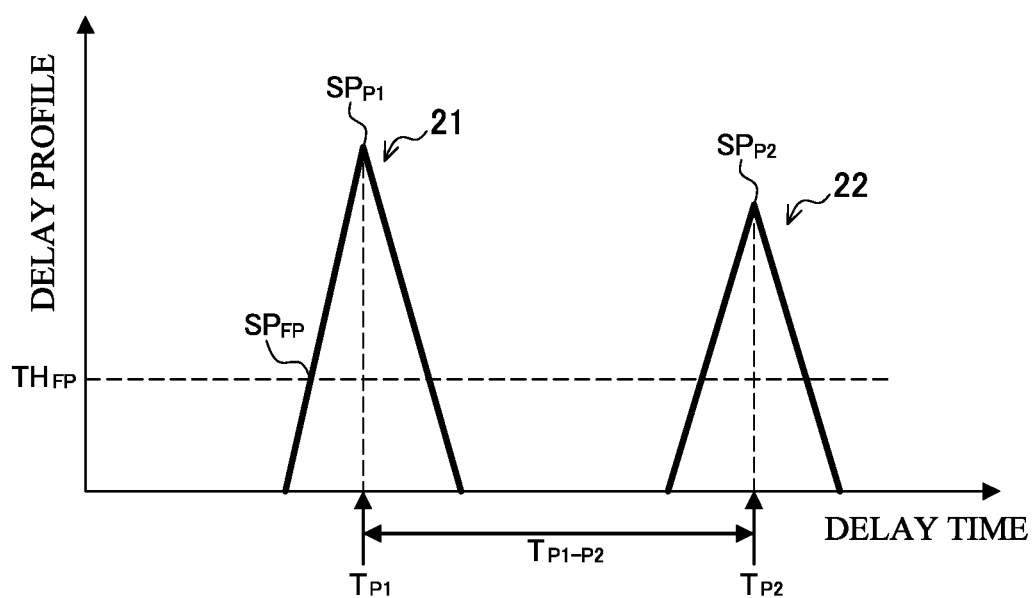
FIG. 11 is a graph illustrating an example of CIR.
Figure 12:
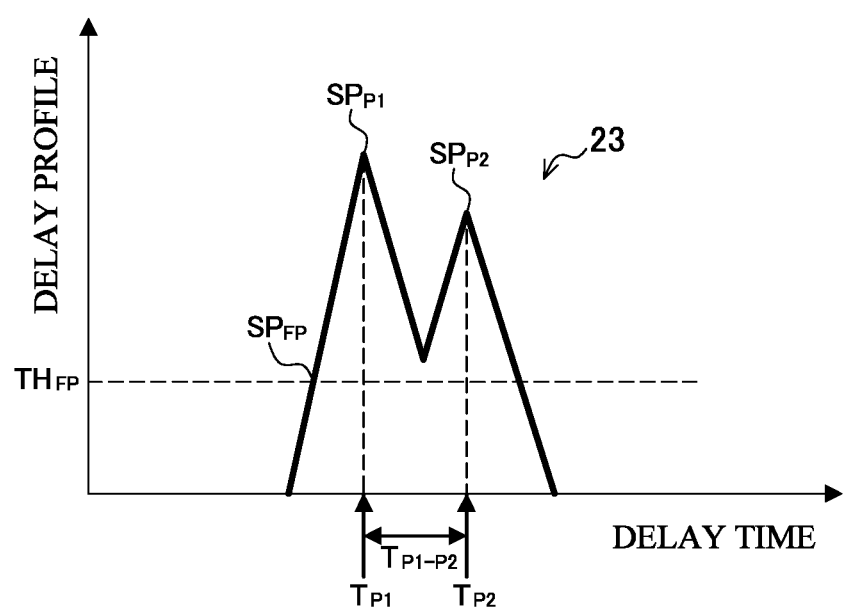
FIG. 12 is a graph illustrating an example of CIR.

FIG. 11 and FIG. 12 are graphs illustrating examples of the Ms. The graph includes a horizontal axis representing delay time. The graph includes a vertical axis representing absolute values of CIR values (such as electric power or amplitude).

The CIR illustrated in FIG. 11 includes a set 21 of elements corresponding to the direct wave, and a set 22 of elements corresponding to the delayed wave. The set 21 includes a specific element $SP_{FP}$ that is an element whose CIR value exceeds a first path threshold $TH_{FP}$ for the first time. In other words, the set 21 corresponds to the first incoming wave. The set 21 includes a first element $SP_{P1}$ having a peak CIR value for the first time after the specific element $SP_{FP}$. On the other hand, the set 22 includes a second element $SP_{P2}$ having a peak CIR value for the second time after the specific element $SP_{FP}$.

The CIR illustrated in FIG. 12 includes a set 23 of elements corresponding to the combined wave received in a state where the direct wave is combined with the delayed wave having a different phase from the direct wave. The CIR waveform of the set 23 has two peaks because two waves having different phases are combined. The set 23 includes a specific element $SP_{FP}$ that is an element whose CIR value exceeds a first path threshold $TH_{FP}$ for the first time. In other words, the set 23 corresponds to the first incoming wave. The set 23 includes a first element $SP_{P1}$ having a peak CIR value for the first time after the specific element $SP_{FP}$. The set 23 includes a second element $SP_{P2}$ having a peak CIR value for the second time after the specific element $SP_{FP}$.

In the case where the direct wave is detected as the first incoming wave, the first incoming wave has a CIR waveform with a single peak as illustrated in FIG. 11. On the other hand, in the case where the combined wave is detected as the first incoming wave, the first incoming wave has a CIR waveform with multiple peaks as illustrated in FIG. 12. In addition, it is possible to determine whether the first incoming wave has the CIR waveform with the single peak or the multiple peaks on the basis of a difference $T_{P1\text{-}P2}$ between the delay time $T_{P1}$ of the first element $SP_{P1}$ and the delay time $T_{P2}$ of the second element $SP_{P2}$. This is because a large difference $T_{P1\text{-}P2}$ may be obtained in the case where the first incoming wave has the CIR waveform with the single peak. In addition, a smaller difference $T_{P1\text{-}P2}$ may be obtained in the case where the first incoming wave has the CIR waveform with the multiple peaks.

In the case where the combined wave is detected as the first incoming wave, accuracy of estimating the positional parameter deteriorates in comparison with the case where the direct wave is detected as the first incoming wave. Therefore, it can be said that the larger difference $T_{P1\text{-}P2}$ means higher reliability. As described above, it is possible to evaluate reliability by using the difference $T_{P1\text{-}P2}$. The difference $T_{P1\text{-}P2}$ is the fifth reliability parameter.

Sixth Reliability Parameter

The reliability parameter may include a sixth reliability parameter derived from correlation between CIR waveforms of the antennas 211 in a pair. Details of the sixth reliability parameter will be described with reference to FIG. 13.

FIG. 13 is graphs illustrating examples of CIRs with regard to the plurality of antennas 211. A CIR 20A illustrated in FIG. 13 is a graph illustrating an example of a CIR with regard to the antenna 211A. A CIR 20B illustrated in FIG. 13 is a graph illustrating an example of a CIR with regard to the antenna 211B. Each graph includes a horizontal axis representing delay time. It is assumed that a time axis of the CIR 20A is synchronous with a time axis of the CIR 20B. Each graph includes a vertical axis representing absolute values of CIR values (such as amplitude or electric power).

The CIR 20A includes a set 23A of elements corresponding to the combined wave received in a state where the direct wave is combined with the delayed wave having a different phase from the direct wave. The CIR waveform of the set 23A has two peaks because two waves having different phases are combined. The set 23A includes a specific element $SP_{FP}$ that is an element whose CIR value exceeds the first path threshold $TH_{FP}$ for the first time. In other words, the set 23A corresponds to the first incoming wave.

On the other hand, the CIR 20B includes a set 23B of elements corresponding to the combined wave received in a state where the direct wave is combined with the delayed wave having a same phase as the direct wave. The CIR waveform of the set 23 has a single large peak because two waves having the same phase are combined. The set 23B includes a specific element $SP_{FP}$ that is an element whose CIR value exceeds the first path threshold $TH_{FP}$ for the first time. In other words, the set 23B corresponds to the first incoming wave.

In the case where the plurality of antennas 211 receive signals in the state where the direct wave is combined with the delayed wave, the antennas 211 have different relations of phases of the direct wave and the delayed wave even if a distance between the antennas 211 is short. As a result, different CIR waveforms are obtained as illustrated in the CIR 20A and CIR 20B. In other words, the different CIR waveforms between the antennas 211 in a pair mean that a combined wave is received by at least one of the antennas 211 in the pair. In the case where the combined wave is detected as the first incoming wave, that is, in the case where detection of the specific element corresponding to the direct wave ends in failure, accuracy of estimating the positional parameter deteriorates.

Accordingly, the sixth reliability parameter may be a correlation coefficient between a CIR obtained on the basis of reception signal received by a first antenna 211 among the plurality of antennas 211, and a CIR obtained on the basis of a reception signal received by a second antenna 211 that is different from the first antenna 211 among the plurality of antennas 211. In other words, the sixth reliability parameter may be a correlation coefficient between a waveform of the entire CIR calculated with regard to the first antenna 211 and a waveform of the entire CIR calculated with regard to the second antenna 211. In addition, the control section 230 determines that reliability gets higher as the correlation coefficient increases. On the other hand, the control section 230 determines that reliability gets lower as the correlation coefficient decreases. Such a configuration makes it possible to evaluate reliability from a viewpoint of correlation between CIR waveforms.

Here, the delay time and the phase of the specific element is used for the process of estimating the positional parameter. Therefore, the reliability parameter may be derived from correlation between CIR waveforms close to the specific element.

In other words, the sixth reliability parameter may be a correlation coefficient between chronological change in CIR value of a portion including the specific element in the CIR obtained on the basis of reception signal received by the first antenna 211 among the plurality of antennas 211, and chronological change in CIR value of a portion including the specific element in the CIR obtained on the basis of the reception signal received by the second antenna 211 that is different from the first antenna 211 among the plurality of antennas 211. Here, the portion means a set including the specific element and one or more elements that exist before and/or after the specific element. In other words, the sixth reliability parameter may be a correlation coefficient between a waveform obtained in a vicinity of the specific element in the CIR calculated with regard to the first antenna 211, and a waveform obtained in a vicinity of the specific element in the CIR calculated with regard to the second antenna 211. In addition, the control section 230 determines that reliability gets higher as the correlation coefficient increases. On the other hand, the control section 230 determines that reliability gets lower as the correlation coefficient decreases. Such a configuration makes it possible to evaluate reliability from a viewpoint of correlation between CIR waveforms obtained in the vicinity of the specific element. In addition, such a configuration makes it possible to reduce an amount of calculation in comparison with the case of correlating waveforms of the entire CIRs.

Note that, the correlation coefficient may be the Pearson correlation coefficient.

The CIR may include amplitude or electric power, which is a CIR value, as an element obtained at each delay time. In this case, the control section 230 calculates a correlation coefficient by correlating respective amplitudes or electric powers obtained at corresponding delay times, which are included in the two CIRs. Note that, the corresponding delay times indicates a same delay time in an environment where the time axes of the two CIRs are synchronous with each other.

The CIR may include a complex number, which is a CIR value, as the element obtained at each delay time. In this case, the control section 230 calculates a correlation coefficient by correlating respective complex numbers obtained at corresponding delay times, which are included in the two CIRs. The complex number includes a phase component in addition to an amplitude component. Therefore, it is possible to calculate a more accurate correlation coefficient than the case of calculating a correlation coefficient on the basis of amplitude or electric power.

Seventh Reliability Parameter

The reliability parameter may include a seventh reliability parameter that is a difference between delay time of a specific element and delay time of an element having a maximum CIR value in a CIR. Details of the seventh reliability parameter will be described with reference to FIG. 14 and FIG. 15.

Figure 14:
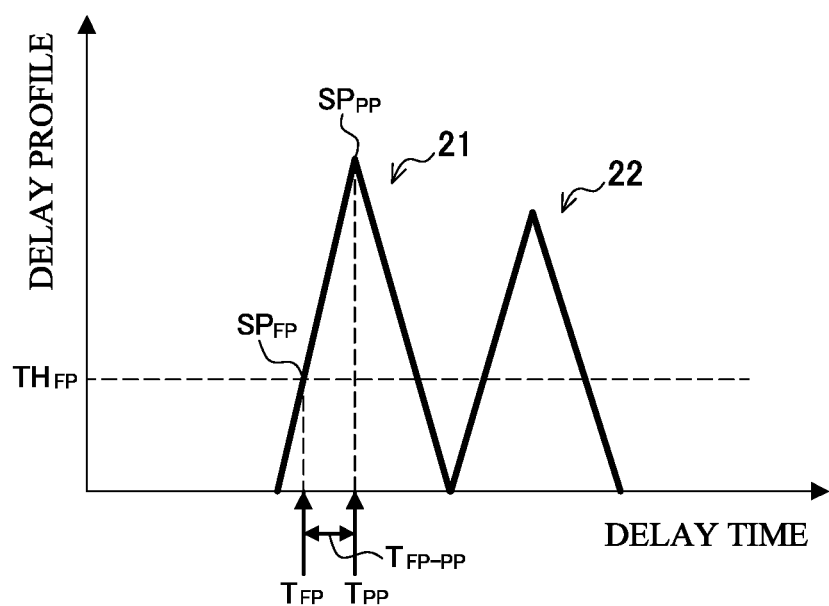
FIG. 14 is a graph illustrating an example of a CIR with regard to the wireless communication section in a LOS condition.
Figure 15:
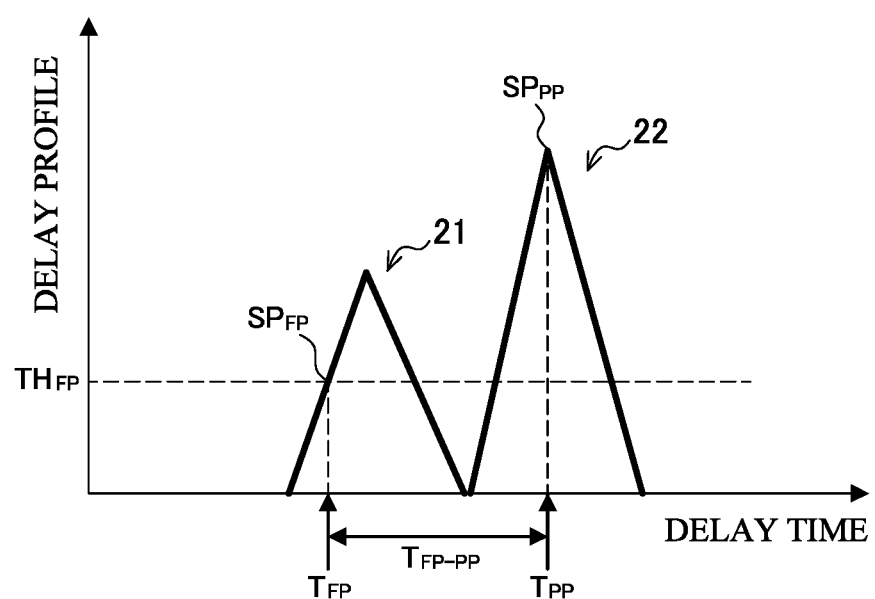
FIG. 15 is a graph illustrating an example of a CIR with regard to the wireless communication section in an NLOS condition.

FIG. 14 is a graph illustrating an example of a CIR with regard to the antenna 211 in the LOS condition. FIG. 15 is a graph illustrating an example of a CIR with regard to the antenna 211 in the NLOS condition. The graph includes a horizontal axis representing delay time. The graph includes a vertical axis representing absolute values of CIR values (such as electric power or amplitude).

The CIR illustrated in FIG. 14 includes a set 21 of elements corresponding to the direct wave, and a set 22 of elements corresponding to the delayed wave. The set 21 includes a specific element $SP_{FP}$ that is an element whose CIR value exceeds a first path threshold $TH_{FP}$ for the first time. In other words, the set 21 corresponds to the first incoming wave. In addition, the set 21 includes an element $SP_{PP}$ having a maximum CIR value in the CIR.

The CIR illustrated in FIG. 15 include a set 21 of elements corresponding to the direct wave, and a set 22 of elements corresponding to the delayed wave. The set 21 includes a specific element $SP_{FP}$ that is an element whose CIR value exceeds a first path threshold $TH_{FP}$ for the first time. In other words, the set 21 corresponds to the first incoming wave. On the other hand, the set 22 includes an element $SP_{PP}$ having a maximum CIR value in the CIR.

In the case of the LOS condition, the direct wave has the largest CIR value. Therefore, as illustrated in FIG. 14, the set 21 corresponding to the direct wave includes the element $SP_{PP}$ having the maximum CIR value in the CIR.

On the other hand, in the case of the NLOS condition, a CIR value of the delayed wave may be larger than a CIR value of the direct wave. In the case of the NLOS condition, this is because there is an obstacle in the first path. In particular, if a human body is interposed between the first path, the direct wave drastically attenuates when the direct wave passes through the human body. In this case, as illustrated in FIG. 15, the set 21 corresponding to the direct wave does not the element $SP_{PP}$ having the maximum CIR value in the CIR.

It is possible to determine whether the antenna 211 is in the LOS condition or the NLOS condition, on the basis of a difference $T_{FP\_PP}$ between delay time $T_{FP}$ of the specific element $SP_{PP}$ and delay time $T_{PP}$ of the element $SP_{PP}$ having the maximum CIR value in the CIR. This is because the difference $T_{FP\_PP}$ may be small in the case where the antenna 211 is in the LOS condition as illustrated in FIG. 14. In addition, the difference $T_{FP\_PP}$ may be large in the case where the wireless antenna 211 is in the NLOS condition as illustrated in FIG. 15.

In the case of the NLOS condition, the accuracy of estimating the positional parameter deteriorates in comparison with the case of the LOS condition. Therefore, it can be said that higher reliability is obtained as the difference $T_{FP\text{-}PP}$ decreases. As described above, it is possible to evaluate reliability by using the difference $T_{FP\text{-}PP}$. The difference $T_{FP\_PP}$ is the seventh reliability parameter.

<2.4. Measurement Process and Positional Parameter Determination Process>

The communication unit 200 (more specifically, control section 230) performs a measurement process including reception of wireless signals by the wireless communication section 210, and calculation of a reliability parameter serving as an indicator that indicates whether the detected first incoming wave is appropriate for a processing target among the received wireless signals. Next, the communication unit 200 controls the positional parameter determination process on the basis of the reliability parameter obtained through the measurement process. In the positional parameter determination process, the positional parameter indicating the position of the other communication device is determined on the basis of the first incoming wave obtained through the measurement process. Specifically, the communication unit 200 determines the positional parameter on the basis of the first incoming wave corresponding to the reliability parameter representing high reliability. Such a configuration allows the communication unit 200 to determine the position of the portable device 100 with higher accuracy.

Measurement Process

In the measurement process, the communication unit 200 transmits the first ranging signal from one of the plurality of antennas 211 of the wireless communication section 210. When the first ranging signal is received, the portable device 100 transmits a wireless signal (corresponding to the second ranging signal and the angle estimation signal) in response. Next, the communication unit 200 receives the wireless signal by the plurality of antennas 211. The series of communication may also be referred to as position estimation communication. Next, the reliability parameter is calculated on the basis of the first incoming waves detected through the position estimation communication. Here, the positional parameter estimation process may be performed in the measurement process. This is because the positional parameters may be used for calculating the second reliability parameter and the fourth reliability parameter.

Note that, distances between the portable device 100 and the respective antennas 211A to 211D may be different from each other. Therefore, a first incoming wave received from a single antenna 211 that has received the first ranging signal is used for estimating the distance R in the positional parameter estimation process.

The position estimation communication may be performed multiple times in the measurement process. In other words, the communication unit 200 receives a wireless signal by the wireless communication section 210 multiple times in the single measurement process. Therefore, multiple combinations of the first incoming wave and the reliability parameter can be obtained through the measurement process.

Note that, in the case of performing the position estimation process multiple times, it is desirable to transmit/receive a signal by using a different antenna 211 each time. This is because the respective antennas 211 may have different reliabilities of the received first incoming waves. This makes it possible to perform a positional parameter determination process (to be described later) by using a first incoming wave with higher reliability among the plurality of first incoming waves received by the respective antennas 211.

Positional Parameter Determination Process

The communication unit 200 determines the positional parameter of the portable device 100 on the basis of a plurality of first incoming waves obtained through the measurement processes. Specifically, the communication unit 200 determines the positional parameter of the portable device 100 on the basis of the plurality of first incoming waves obtained through the position estimation communication performed multiple times in the measurement process. This makes it possible to determine the positional parameter without overly depending on each first incoming wave.

In particular, the communication unit 200 determines the positional parameter by applying a statistical process based on the reliability parameter, to a plurality of positional parameters estimated through the positional parameter estimation process on the basis of the respective first incoming waves. Specifically, the communication unit 200 determines, as the positional parameter, a representative value derived from the plurality of estimated positional parameters on the basis of the reliability parameter. For example, the communication unit 200 may determine the positional parameter by adopting a positional parameter estimated on the basis of a first incoming wave corresponding to the reliability parameter representing highest reliability. For another example, the communication unit 200 may determine the positional parameter by averaging the plurality of estimated positional parameters through weighted averaging based on the reliability parameter. At this time, a heavier weight is given to a positional parameter estimated on the basis of the first incoming wave corresponding to the reliability parameter representing high reliability, and a lighter weight is given to a positional parameter estimated on the basis of a first incoming wave corresponding to a reliability parameter representing low reliability. For another example, the communication unit 200 may determine the positional parameter by averaging or calculating a median of a plurality of estimated positional parameters other than positional parameters estimated on the basis of first incoming waves corresponding to reliability parameters representing low reliability. Note that, such statistical processes may be applicable in combination. Such a configuration makes it possible to determine the positional parameter having high accuracy.

Here, sometimes the positional parameter estimation process has already been performed in the measurement process to calculate the reliability parameter. In this case, the communication unit 200 does not perform the positional parameter estimation process again, but uses a positional parameter estimated through the positional parameter estimation process performed in the measurement process. On the other hand, in the case where the positional parameter estimation process has not been performed in the measurement process, the communication unit 200 performs the positional parameter estimation process in the positional parameter determination process.

The communication unit 200 does not have to determine the positional parameter in the positional parameter determination process in the case where a predetermined condition is satisfied. Hereinafter, such a predetermined condition is also referred to as a suspension condition. A first example of the suspension condition is a condition that a predetermined number of first incoming waves corresponding to a reliability parameter representing a certain degree of high reliability (reliability of a first threshold or more) is not obtained in the measurement process. A second example of the suspension condition is a condition that a first incoming wave corresponding to a reliability parameter representing significantly low reliability (reliability of a second threshold or less) is obtained in the measurement process. Such a configuration makes it possible to avoid a situation of determining a positional parameter with flagrant error, by determining no positional parameter in a situation where it is expected that accuracy of determining the positional parameter is low.

<2.5. Area Determination Process>

The communication unit 200 determines an area (in other words, space) including the portable device 100 on the basis of the positional parameter determined through the positional parameter determination process. For example, in the case where the area is defined by a distance from the communication unit 200, the communication unit 200 determines the area to which the portable device 100 belongs on the basis of the distance R. For another example, in the case where the area is defined by an angle with respect to the communication unit 200, the communication unit 200 determines the area to which the portable device 100 belongs on the basis of the angles $\alpha$ and $\beta$. For another example, in the case where the area is defined by three-dimensional coordinates, the communication unit 200 determines the area to which the portable device 100 belongs on the basis of the coordinates (x, y, z). Alternatively, in an area determination process specific to the vehicle 202, the communication unit 200 may determine the area including the portable device 100 among the plurality of areas including the vehicle interior and the vehicle exterior of the vehicle 202. This makes it possible to provide courteous service such as providing different service in the case where the user is in the vehicle interior and in the case where the user is in the vehicle exterior. In addition, the communication unit 200 may determines the area including the portable device 100 among nearby areas and faraway areas. The nearby areas are areas within a predetermined distance from the vehicle 202, and the faraway areas are the predetermined distance or more away from the vehicle 202.

For example, the area including the portable device 100 determined through the area determination process may be used for authentication of the portable device 100. For example, the communication unit 200 determines that the authentication is successful and unlock a door in the case where the portable device 100 is in an area close to the communication unit 200 on a driver seat side.

As described above, according to the present embodiment, the communication unit 200 is capable of determining the position of the portable device 100 (positional parameter and area) with high accuracy by controlling the process of determining the position in accordance with a radio propagation environment. In addition, the communication unit 200 performs authentication on the basis of the area determined with high accuracy. This makes it possible to prevent erroneous authentication and improve its security.

<2.6. Flow of Process>

(1) First Example

Figure 16:
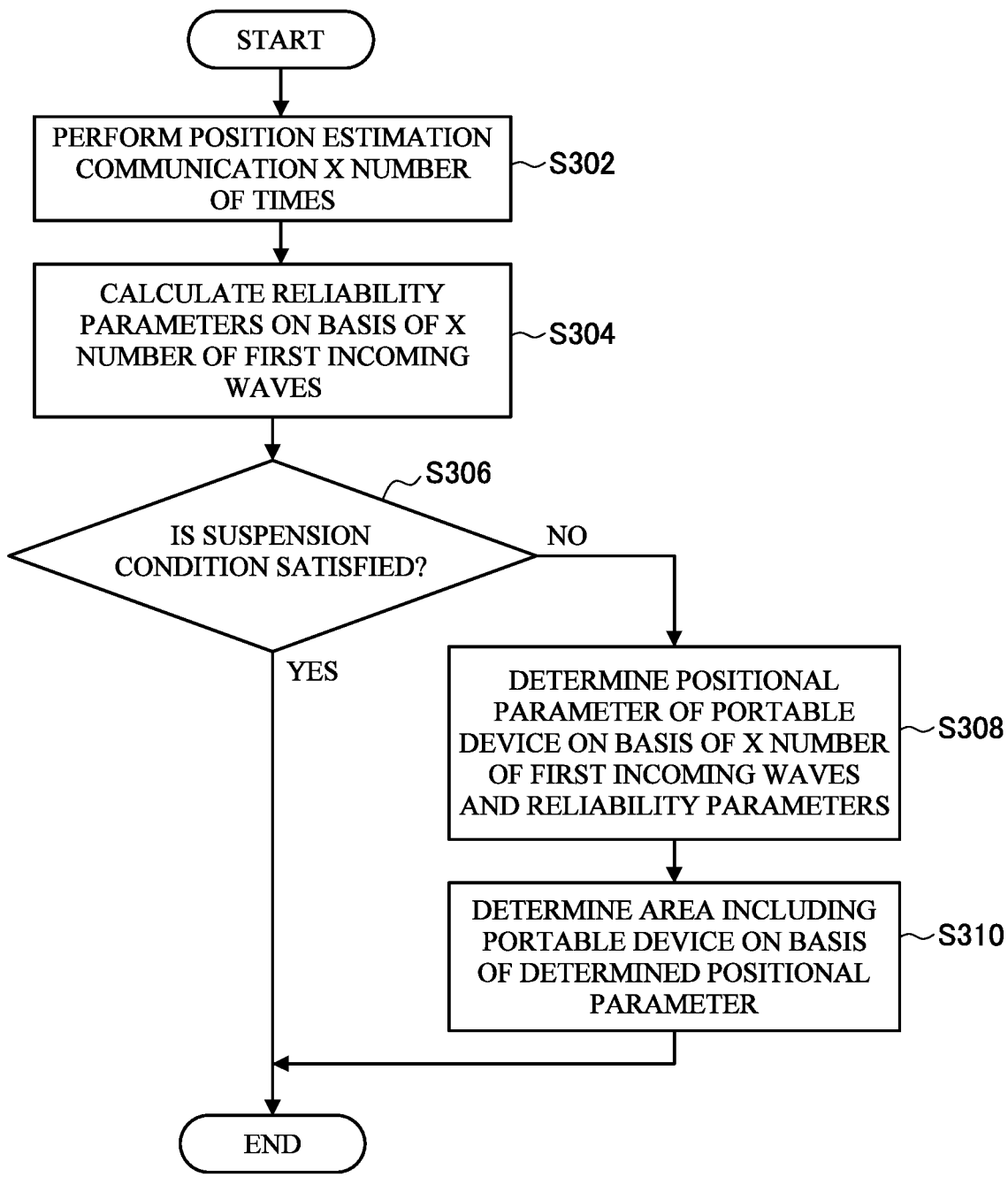
FIG. 16 is a flowchart illustrating an example of a flow of a position determination process executed by a communication unit of a vehicle according to the embodiment.

FIG. 16 is a flowchart illustrating an example of a flow of the position determination process executed by the communication unit 200 of the vehicle 202 according to the present embodiment. According to this flowchart, it is assumed that position estimation communication is performed X number of times in the measurement process.

As illustrated in FIG. 16, the communication unit 200 first performs the position estimation communication X number of times (Step S302). Next, the communication unit 200 calculates the reliability parameters on the basis of X number of the first incoming waves obtained through the position estimation communication performed X number of times (Step S304). Next, the communication unit 200 determines whether or not the suspension condition is satisfied (Step S306). In the case where it is determined that the suspension condition is satisfied (YES in Step S306), the communication unit 200 ends the process without determining the positional parameter or the area. On the other hand, in the case where it is determined that the suspension condition is not satisfied (NO in Step S306), the communication unit 200 determines the positional parameter of the portable device 100 on the basis of the X number of first incoming waves and the reliability parameters (Step S308). Next, the communication unit 200 determines the area including the portable device 100 on the basis of the determined positional parameter (Step S310).

(2) Second Example

Figure 17:
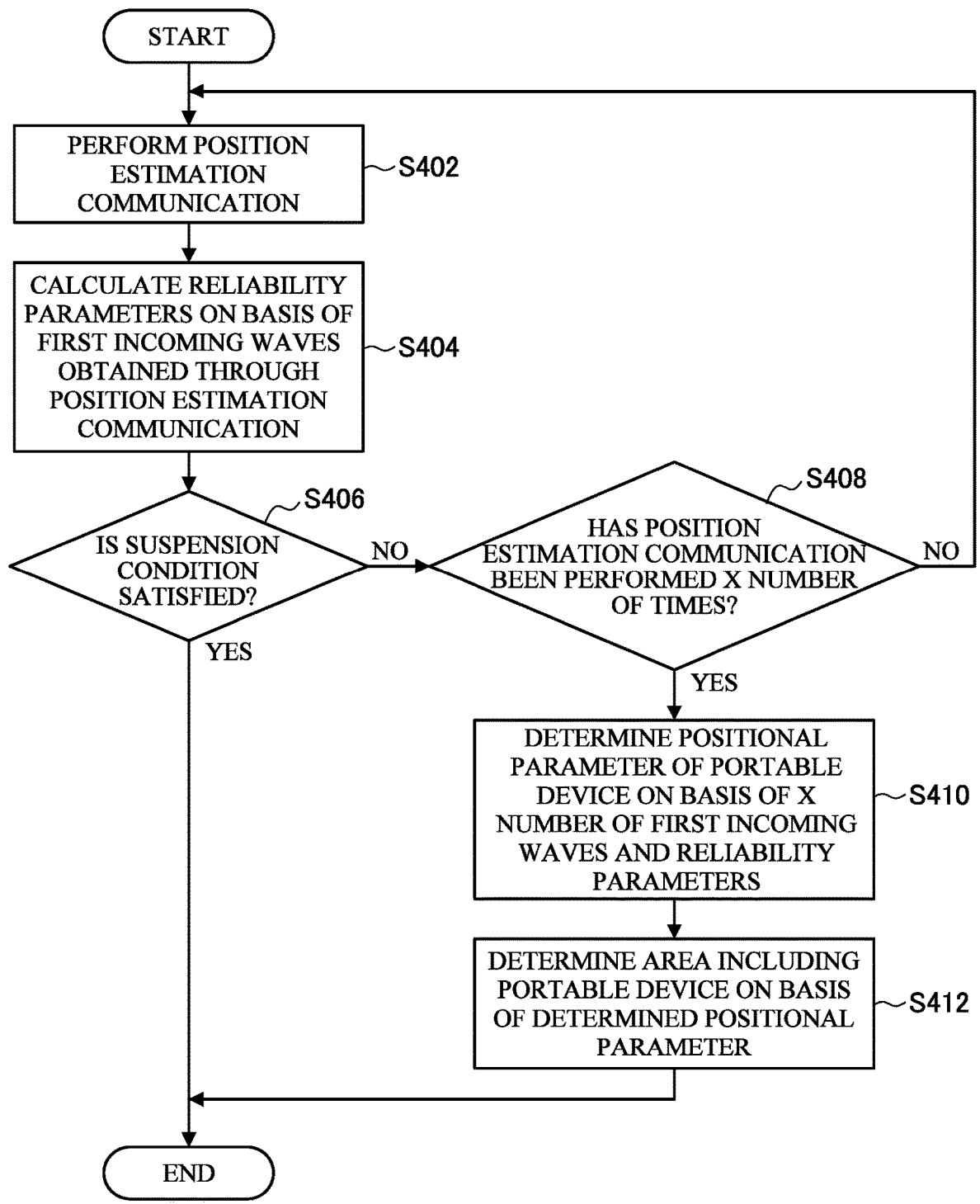
FIG. 17 is a flowchart illustrating an example of a flow of a position determination process executed by the communication unit of the vehicle according to the embodiment.

FIG. 17 is a flowchart illustrating an example of a flow of the position determination process executed by the communication unit 200 of the vehicle 202 according to the present embodiment. According to this flowchart, it is assumed that position estimation communication is performed X number of times in the measurement process. In addition, it is assumed that the above-described second example of suspension condition is used as the suspension condition in this flowchart.

As illustrated in FIG. 17, the communication unit 200 first performs the position estimation communication (Step S402). Next, the communication unit 200 calculates the reliability parameters on the basis of the first incoming waves obtained through the position estimation communication (Step S404). Next, the communication unit 200 determines whether or not the suspension condition is satisfied (Step S406). In the case where it is determined that the suspension condition is satisfied (YES in Step S406), the communication unit 200 ends the process without determining the positional parameter or the area. On the other hand, in the case where it is determined that the suspension condition is not satisfied (NO in Step S406), the communication unit 200 determines whether or not the position estimation communication has been performed X number of times (Step S408). In the case where it is determined that the position estimation communication has not been performed X number of times (NO in Step S408), the process returns to Step S402 and repeats the position estimation communication again. On the other hand, in the case where it is determined that the position estimation communication has been performed X number of times (YES in Step S408), the communication unit 200 determines the positional parameter of the portable device 100 on the basis of the reliability parameters and X number of the first incoming waves obtained through the position estimation communication performed X number of times (Step S410). Next, the communication unit 200 determines the area including the portable device 100 on the basis of the determined positional parameter (Step S412).

3. Supplement

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

For example, according to the above-described embodiment, the area including the portable device 100 has been described separately from the positional parameters such as the distance R, the angles α and β, and the coordinates (x, y, z). However, the present invention is not limited thereto. The positional parameters may include information indicating the area including the portable device 100. In this case, the area including the portable device 100 is estimated/determined through the positional parameter estimation process/positional parameter determination process.

For example, according to the above-described embodiment, the description has been given with reference to the example in which the angles α and β are calculated on the basis of antenna array phase differences with regard to an antenna pair. However, the present invention is not limited thereto. For example, the communication unit 200 may calculate the angles α and β through beamforming using the plurality of antennas 211. In this case, the communication unit 200 scans main lobes of the plurality of antennas 211 in all the directions, determines that the portable device 100 exists in a direction with largest reception electric power, and calculates the angles α and β on the basis of this direction.

For example, according to the above-described embodiment, as described with reference to FIG. 5, the local coordinate system has been treated as a coordinate system including coordinate axes parallel to axes connecting the antennas in the pairs. However, the present invention is not limited thereto. For example, the local coordinate system may be a coordinate system including coordinate axes that are not parallel to the axes connecting the antennas in the pairs. In addition, the origin is not limited to the center of the plurality antennas 211. The local coordinate system according to the present embodiment may be arbitrarily set on the basis of arrangement of the plurality of antennas 211 of the communication unit 200.

For example, although the example in which the portable device 100 serves as the authenticatee and the communication unit 200 serves as the authenticator has been described in the above embodiment, the present invention is not limited thereto. The roles of the portable device 100 and the communication unit may be reversed. For example, it is also possible for the portable device 100 to determine the positional parameters and determine an area including the communication unit 200. In addition, the roles of the portable device 100 and the communication unit 200 may be switched dynamically. In addition, a plurality of the communication units 200 may determine the positional parameters, determine the areas, and perform the authentication.

For example, although the example in which the present invention is applied to the smart entry system has been described in the above embodiment, the present invention is not limited thereto. The present invention is applicable to any system that performs the ranging and authentication by transmitting/receiving signals. For example, the present invention is applicable to a pair of any devices selected from a group including portable devices, vehicles, smartphones, drones, houses, home appliances, and the like. In this case, one in the pair operates as the authenticator, and the other in the pair operates as the authenticatee. Note that, the pair may include two device of a same type, or may include two different types of devices. In addition, the present invention is applicable to a case where a wireless local area network (LAN) router determines a position of the smartphone.

For example, in the above embodiment, the standard using UWB has been exemplified as the wireless communication standard. However, the present invention is not limited thereto. For example, it is also possible to use a standard using infrared as the wireless communication standard.

Note that, a series of processes performed by the devices described in this specification may be achieved by any of software, hardware, and a combination of software and hardware. A program that configures software is stored in advance in, for example, a recording medium (non-transitory medium) installed inside or outside the devices. In addition, for example, when a computer executes the programs, the programs are read into random access memory (RAM), and executed by a processor such as a CPU. The recording medium may be a magnetic disk, an optical disc, a magneto-optical disc, flash memory, or the like. Alternatively, the above-described computer program may be distributed via a network without using the recording medium, for example.

Further, in the present specification, the processes described using flowcharts are not necessarily executed in the order illustrated in the drawings. Some processing steps may be executed in parallel. In addition, additional processing steps may be employed and some processing steps may be omitted.

REFERENCE SIGNS LIST 1 system
100 portable device
110 wireless communication section
111 antenna
120 storage section
130 control section 200 communication unit
202 vehicle
210 wireless communication section
211 antenna
220 storage section
230 control section

What is claimed is:

1. A communication device, comprising:
a wireless communicator configured to receive wireless signals from another communication device; and
a controller configured
to calculate a channel impulse response (CIR) based on the wireless signals received by the wireless communicator,
to detect a specific element among a plurality of the elements included in the calculated CIR serving as an element detected in accordance with a predetermined detection standard,
to calculate a reliability parameter serving as an indicator that indicates whether the detected specific element is an appropriate process target, and
to control a positional parameter determination process of determining a positional parameter indicating a position of the another communication device on a basis of the detected specific element and the reliability parameter,
wherein the controller performs receiving the wireless signals by the wireless communicator, calculating CIR, and detecting the specific element among the calculated CIR for multiple times, and determines the positional parameter on a basis of a plurality of the specific elements that have been obtained, and
the controller determines the positional parameter by applying a statistical process based on the reliability parameter, to a plurality of the positional parameters, respectively, estimated on a basis of the plurality of first incoming waves.

2. The communication device according to claim 1, wherein the controller does not determine the positional parameter in the positional parameter determination process in the case where a predetermined condition is satisfied.

3. The communication device according to claim 1, wherein the reliability parameter includes a first reliability parameter serving as an indicator that indicates whether the first incoming wave itself is an appropriate detection target.

4. The communication device according to claim 3, wherein the first reliability parameter is calculated on a basis of at least any of a signal-to-noise ratio (SNR) and an electric power value of the first incoming wave.

5. The communication device according to claim 1, wherein the reliability parameter includes a second reliability parameter serving as an indicator that indicates suitability of a direct wave for the first incoming wave, and
the direct wave is a signal received through a shortest path from a transmitter to a receiver.

6. The communication device according to claim 5, wherein the second reliability parameter is calculated on a basis of at least any of a reception time and an electric power value of the first incoming wave with regard to each of a plurality of antennas of the wireless communicator.

7. The communication device according to claim 5, wherein the second reliability parameter is calculated on a basis of consistency between positional parameters indicating positions of the another communication device estimated on a basis of the respective first incoming waves received by a plurality of antenna pairs, each of which includes two different antennas among a plurality of antennas of the wireless communicator.

8. The communication device according to claim 1, wherein the reliability parameter includes a third reliability parameter serving as an indicator that indicates unsuitability of a combined wave for the first incoming wave, and
the combined wave is a signal received in a state of combining a plurality of signals that have passed through a plurality of different paths.

9. The communication device according to claim 8, wherein the third reliability parameter is calculated on a basis of at least any of width of the first incoming wave in a time direction and a state of a phase of the first incoming wave.

10. The communication device according to claim 1, wherein the reliability parameter includes a fourth reliability parameter serving as an indicator that indicates suitability of a situation of receiving the wireless signal.

11. The communication device according to claim 1, wherein the positional parameter includes at least any of a distance to the another communication device from one of a plurality of antennas of the wireless communication section, an angle between a coordinate axis and a straight line connecting the another communication device to an origin of a first predetermined coordinate system, and coordinates of the another other communication device in a second predetermined coordinate system.

12. The communication device according to claim 1, wherein the communication device is installed in a vehicle,
the another communication device is carried by a user of the vehicle, and
the controller determines an area including the another communication device among a plurality of areas including a vehicle interior and a vehicle exterior of the vehicle, on a basis of the positional parameter determined through the positional parameter determination process.

13. A storage medium having a program stored therein, the program, when executed by a computer, caused the computer to control a communication device that receives wireless signals from another communication device, to function as
a controller configured
to calculate a channel impulse response (CIR) based on the wireless signal received by the wireless communicator,
to detect a specific element among a plurality of elements included in the calculated CIR serving as an element detected in accordance with a predetermined decision standard,
to calculate a reliability parameter serving as an indicator that indicates whether the detected specific element is an appropriate process target, and
to control a positional parameter determination process of determining a positional parameter indicating a position of the another communication device on a basis of the detected specific element and the reliability parameter, wherein the controller performs receiving the wireless signals by the wireless communicator, calculating CIR, and detecting the specific element among the calculated CIR for multiple times, and determines the positional parameter on a basis of a plurality of the specific elements that have been obtained, and the controller determines the positional parameter by applying a statistical process based on the reliability parameter, to a plurality of the positional parameters, respectively, estimated on a basis of the plurality of first incoming waves.

* * * * *